(12) United States Patent
Wallace et al.

(10) Patent No.: US 11,529,826 B2
(45) Date of Patent: Dec. 20, 2022

(54) WHEEL COVER ASSEMBLY WITH INSTALLABLE WHEEL RIB AND WHEEL COVER

(71) Applicant: Howmet Aerospace Inc., Pittsburgh, PA (US)

(72) Inventors: Spencer Wallace, Broadview Heights, OH (US); Matt Brest, Hudson, OH (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 433 days.

(21) Appl. No.: 16/563,526

(22) Filed: Sep. 6, 2019

(65) Prior Publication Data

US 2020/0079145 A1    Mar. 12, 2020

Related U.S. Application Data

(60) Provisional application No. 62/728,522, filed on Sep. 7, 2018.

(51) Int. Cl.
  *B60B 7/08*    (2006.01)
  *B60B 7/06*    (2006.01)
  *B60B 21/02*   (2006.01)

(52) U.S. Cl.
  CPC ............... *B60B 7/08* (2013.01); *B60B 7/063* (2013.01); *B60B 21/02* (2013.01); *B60B 2310/302* (2013.01); *B60B 2310/318* (2013.01); *B60B 2320/10* (2013.01); *B60B 2900/1216* (2013.01)

(58) Field of Classification Search
  CPC ........... B60B 7/08; B60B 7/063; B60B 21/02; B60B 2310/302; B60B 2310/318; B60B 2320/10
  See application file for complete search history.

(56) References Cited

U.S. PATENT DOCUMENTS

| | | | | |
|---|---|---|---|---|
| 4,917,441 | A | * | 4/1990 | Iida ............................ B60B 7/08 |
| | | | | 301/37.35 |
| 5,046,784 | A | * | 9/1991 | Carter, III .................. B60B 7/10 |
| | | | | 301/37.36 |
| 8,459,752 | B2 | * | 6/2013 | Russell ...................... B60B 7/12 |
| | | | | 301/37.102 |
| D810,645 | S | | 2/2018 | Sklyut et al. |
| D830,929 | S | | 10/2018 | Sklyut et al. |

(Continued)

FOREIGN PATENT DOCUMENTS

| WO | WO 2019/133318 A1 | 7/2019 | |
|---|---|---|---|
| WO | WO-2020023107 A1 * | 1/2020 | ............... B60B 7/04 |

*Primary Examiner* — Scott A Browne
(74) *Attorney, Agent, or Firm* — Greenberg Traurig, LLP

(57) ABSTRACT

A wheel cover assembly for a vehicle wheel may include a wheel rib that is attachable to a rim inner surface of a wheel rim of the vehicle wheel, a cover body having a cover body outer surface, a cover body inner surface, and a cover body outer edge having an outer diameter that is greater than an inner diameter of the wheel rib and less than an inner diameter of an open end flange of the wheel rim. A cover mounting mechanism operatively connected to the cover body has a cover locking position wherein the cover mounting mechanism engages the wheel rib to retain the wheel rib between the cover mounting mechanism and the cover body and secure the wheel cover assembly to the vehicle wheel when the wheel rib is attached to the rim inner surface.

17 Claims, 13 Drawing Sheets

(56) References Cited

U.S. PATENT DOCUMENTS

| | | |
|---|---|---|
| D836,056 S | 12/2018 | Prasad et al. |
| D836,057 S | 12/2018 | Prasad et al. |
| D836,522 S | 12/2018 | Prasad et al. |
| D853,927 S | 7/2019 | Sklyut et al. |
| 2005/0012383 A1* | 1/2005 | Hsieh ................. B60B 7/12 301/37.102 |
| 2005/0082902 A1* | 4/2005 | Fitzgerald ............ B60B 3/02 301/95.107 |
| 2021/0291586 A1* | 9/2021 | Wallace ............. B60B 7/063 |

* cited by examiner

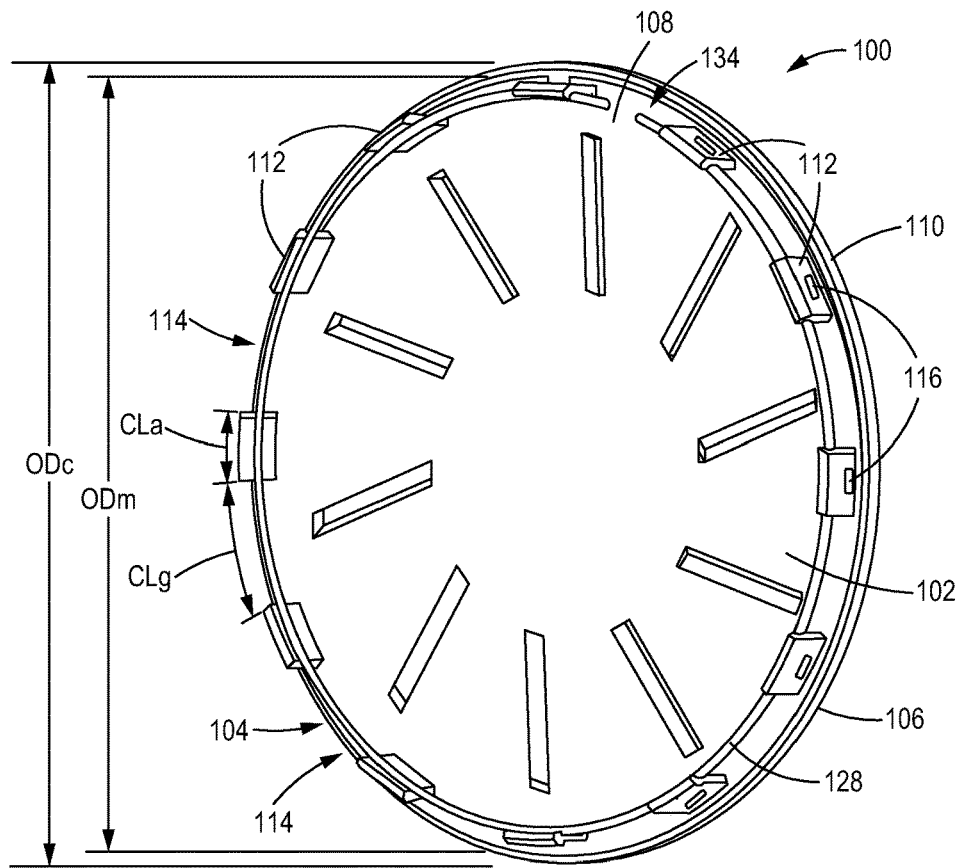
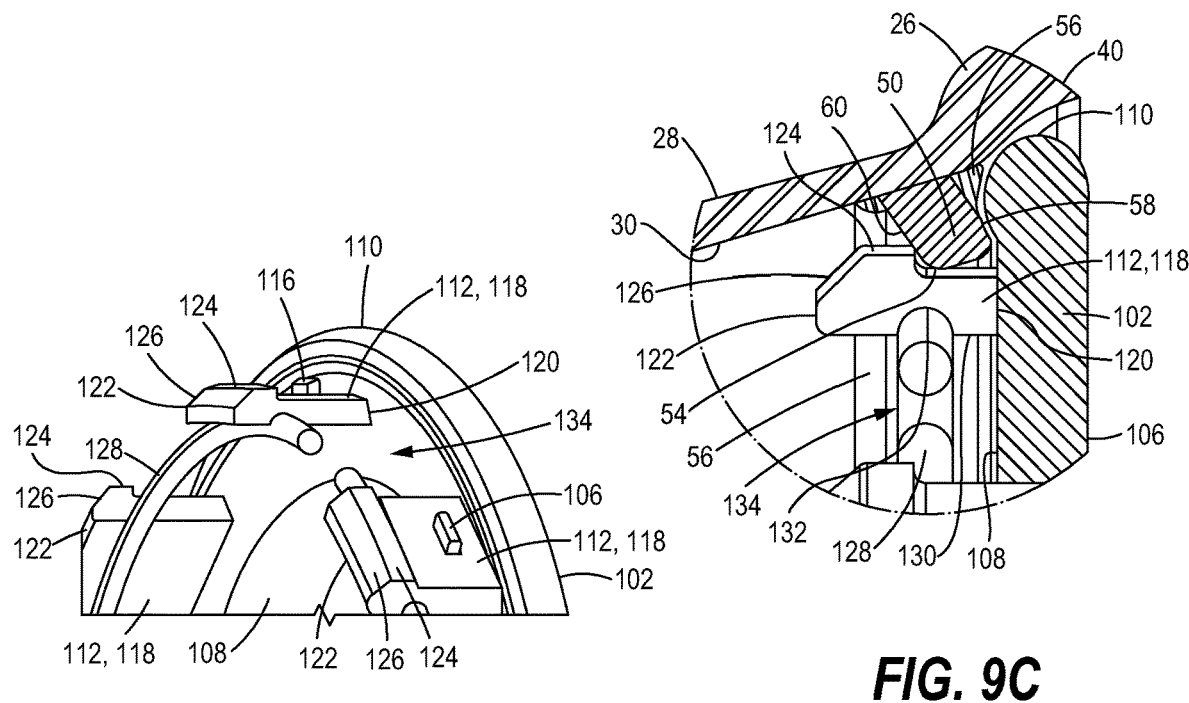
FIG. 9A
FIG. 9B
FIG. 9C

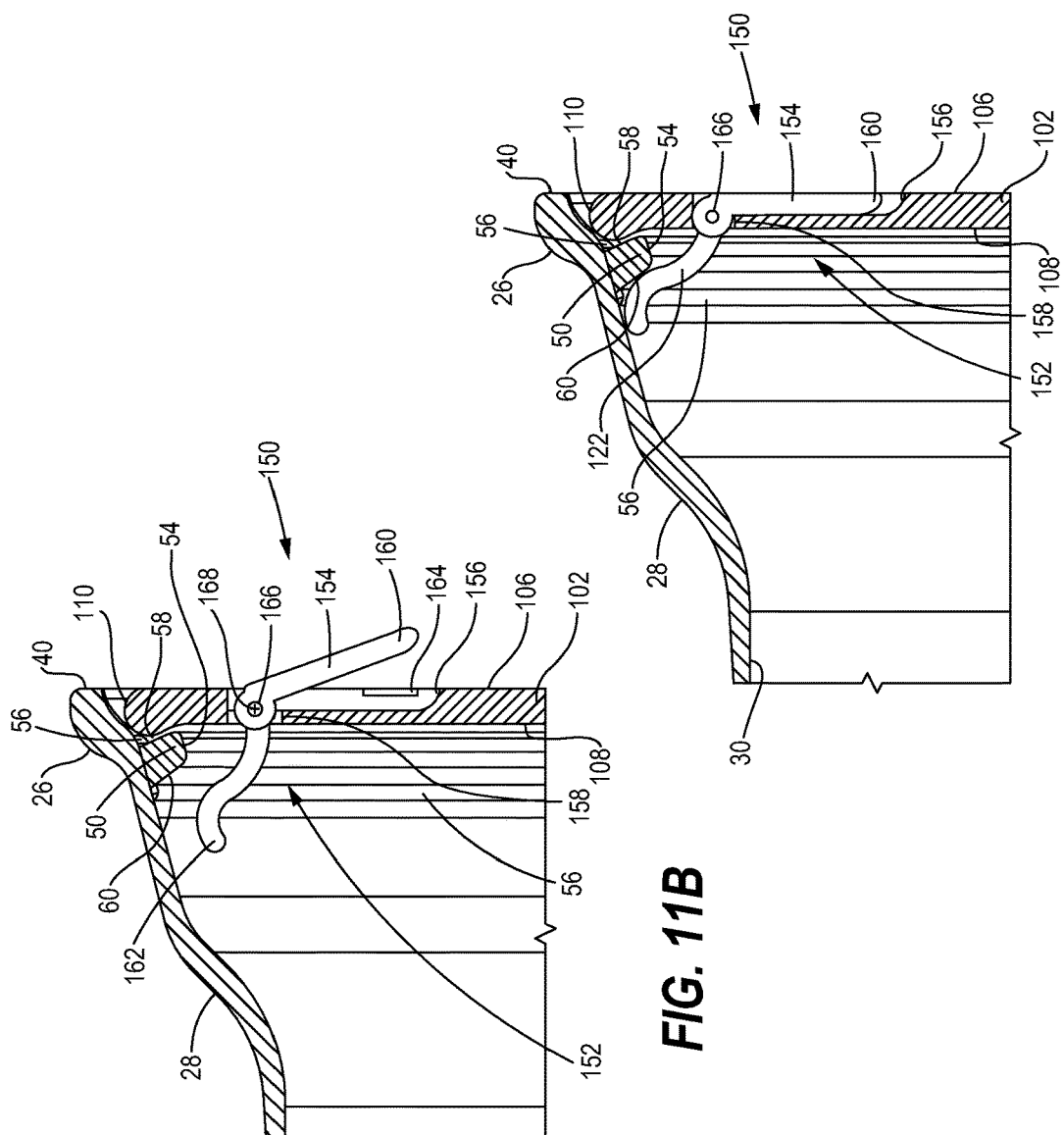

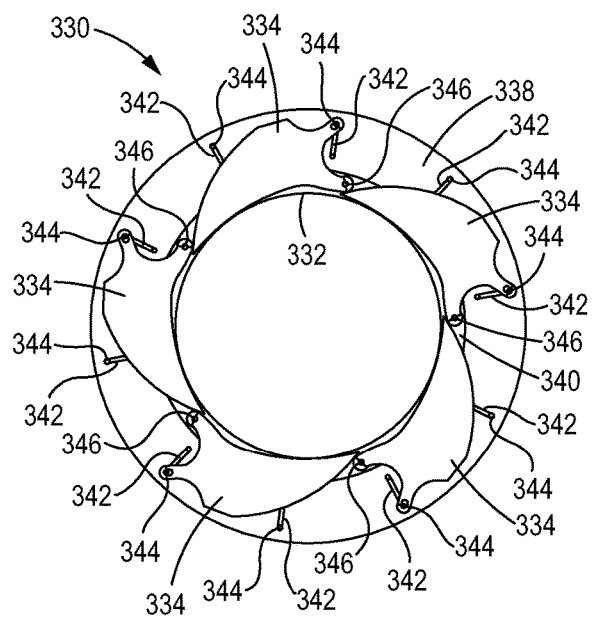 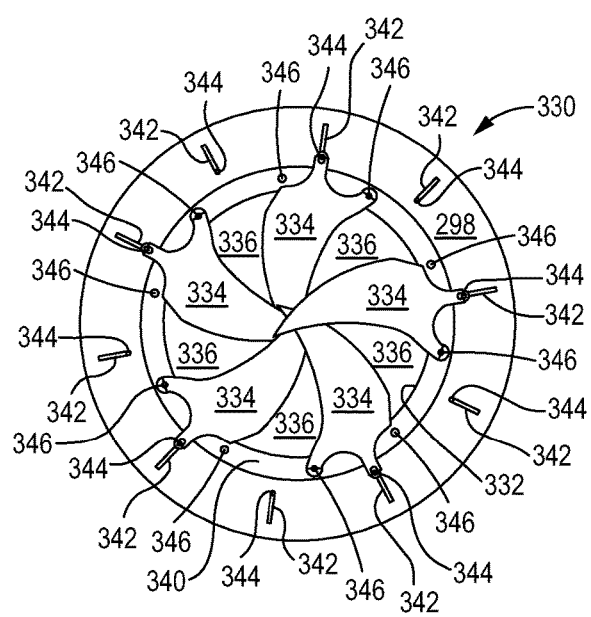
*FIG. 16A*  *FIG. 16B*
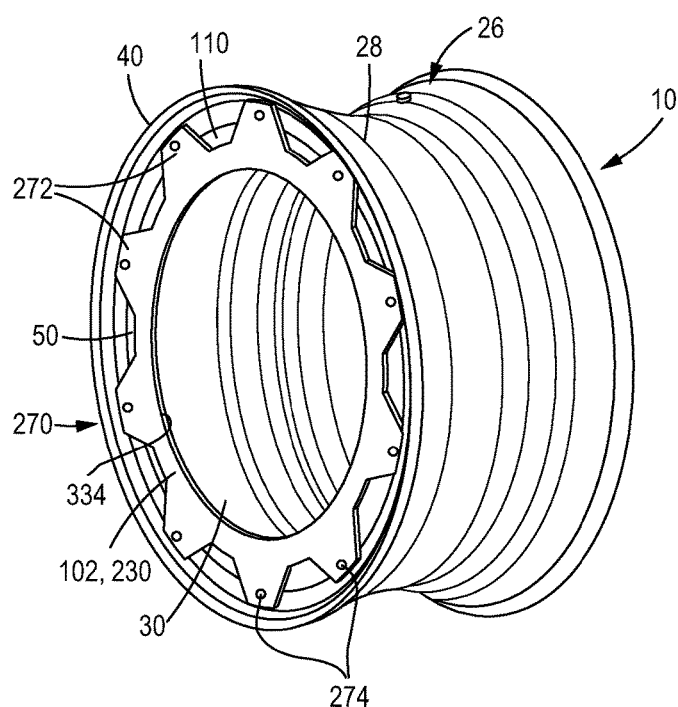 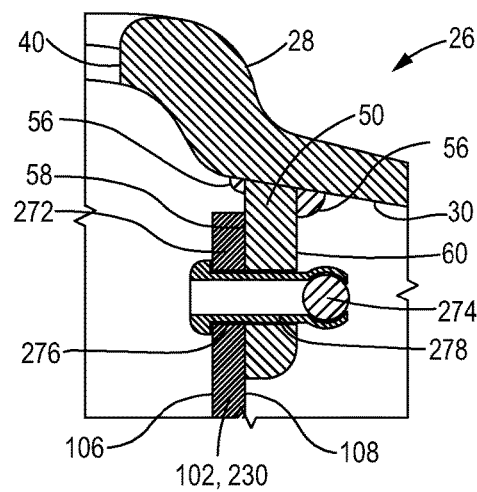
*FIG. 17A*  *FIG. 17B*

WHEEL COVER ASSEMBLY WITH INSTALLABLE WHEEL RIB AND WHEEL COVER

CROSS REFERENCE TO RELATED APPLICATION

This application claims priority to U.S. Provisional Patent Application Ser. No. 62/728,522, filed on Sep. 7, 2018, which application expressly incorporated by reference herein.

TECHNICAL FIELD

The present disclosure relates generally to vehicle wheels and, more particularly, to designs for aerodynamic wheel cover assemblies for wheel rims having installable wheel ribs attachable to rim inner surfaces of wheel rims of the vehicle wheels and wheel covers mountable thereto.

BACKGROUND

Conventionally, vehicle wheels have wheel rims with mounting flanges for mounting the vehicle wheel to the vehicle hub. The wheel rims are annular and often have an open end opposite the mounting flange and on the outboard side of the vehicle wheel. The shape of the wheel rim and the outboard open end can result in a cavity within the wheel rim and an aerodynamic discontinuity that exposes the interior of the wheel rim to the airstream flow past the vehicle and can create noise and drag at highway speeds that are undesirable and can reduce the fuel efficiency of the vehicle.

SUMMARY OF THE DISCLOSURE

In one aspect of the present disclosure, a wheel cover assembly for a vehicle wheel is disclosed. The vehicle wheel has a wheel rim with a rim inner surface, an open end flange defining an open end of the wheel rim and having an open end flange inner diameter. The wheel cover assembly for a vehicle wheel may include a wheel rib having an annular shape, a rib inner diameter, and a rib outer diameter that is less than the open end flange inner diameter so that the wheel rib is attachable to the rim inner surface of the wheel rim to extend inward from the rim inner surface proximate the open end flange, and a cover body having a cover body outer surface, a cover body inner surface opposite the cover body outer surface, and a cover body outer edge having a cover body outer diameter that is greater than the rib inner diameter and less than the open end flange inner diameter. The wheel cover assembly may further include a cover mounting mechanism operatively connected to the cover body and having a cover locking position wherein the cover mounting mechanism engages the wheel rib when the cover body inner surface is facing the wheel rib and engaging one of the wheel rib 50 and the rim inner surface to retain the wheel rib between the cover mounting mechanism and the cover body and secure the wheel cover assembly to the vehicle wheel when the wheel rib is attached to the rim inner surface.

In a further aspect of the present disclosure, a wheel cover assembly for a vehicle wheel having a wheel rim is disclosed. The wheel cover assembly may include a wheel rib having an annular shape, a rib inner diameter, and a rib outer diameter that is less than an open end flange inner diameter of an open end flange of the wheel rim so that the wheel rib is insertable through the open end flange and attachable to a rim inner surface of the wheel rim to extend inward from the rim inner surface of the wheel rim proximate the open end flange, and a cover body having a cover body outer surface, a cover body inner surface opposite the cover body outer surface, and a cover body outer edge having a cover body outer diameter that is greater than the rib inner diameter of the wheel rib. The wheel cover assembly may further include a cover mounting mechanism operatively connected to the cover body and having a plurality of rib engaging elements disposed on the side of the cover body inner surface and circumferentially spaced about the cover body inner surface proximate the cover body outer edge, wherein the plurality of rib engaging elements define a cover mounting mechanism outer diameter that is greater than the rib inner diameter when the plurality of rib engaging elements are disposed in a rib engaging position and is less than the rib inner diameter when the plurality of rib engaging elements are disposed in a rib disengaging position. The plurality of rib engaging elements are movable between the rib engaging position to engage the wheel rib and attach the wheel cover assembly to the wheel rim and the rib disengaging position to disengage the wheel cover assembly from the wheel rim.

In some embodiments, the wheel cover assembly includes a weld attaching the wheel rib to the rim inner surface, and the weld may extend around a circumference of the wheel rib. In some embodiments, the wheel cover assembly includes a rib seal attached between the rim inner surface and a rib outer edge to attach the wheel rib to the rim inner surface, and in others, an adhesive attaches the wheel rib to the rim inner surface. In some other embodiments, the wheel cover assembly includes a plurality of attachment blocks mounted to the rim inner surface and circumferentially spaced about the rim inner surface, with the wheel rib being attached to the plurality of attachment blocks to attach the wheel rib to the rim inner surface.

In some embodiments, the cover mounting mechanism includes a plurality of locking arms extending from the cover body inner surface and circumferentially spaced about the cover body inner surface proximate the cover body outer edge. Each locking arm may include a locking arm body extending from the cover body inner surface and having a body proximal end connected to the cover body inner surface and a body distal end opposite the body proximal end, and a locking arm detent extending radially outward from the locking arm body proximate the body distal end. The locking arm detents may define a cover mounting mechanism outer diameter that is greater than the rib inner diameter, and the locking arm bodies may deflect radially inward when the locking arm detents are engaged by the wheel rib and deflect radially outward when the locking arm detents are disposed on an opposite side of the wheel rib from the cover body so that the wheel rib is retained between the locking arm detents and the cover body inner surface.

In some embodiments, the cover body has a plurality of latch recesses defined in the cover body outer surface and circumferentially spaced about the cover body outer surface proximate the cover body outer edge, and each latch recess may have a latch opening extending through the cover body from the latch recess to the cover body inner surface. The cover mounting mechanism may include a plurality of locking latches, each locking latch associated with a corresponding latch recess and having a latch arm on the side of the cover body outer surface and a latch finger extending through the latch opening to the side of the cover body inner surface. Each locking latch may be operatively connected to the cover body so that the locking latch moves between a latch unlocked position where the latch finger does not engage the wheel rib when the cover body inner surface is facing and engaging the wheel rib, and a latch locked position where the latch finger engages the wheel rib when the cover body inner surface is facing and engaging the wheel rib to retain the wheel rib between the latch finger and the cover body inner surface.

In some embodiments, the cover body has a plurality of latching pin slots extending through the cover body from the cover body outer surface to the cover body inner surface and circumferentially spaced about the cover body outer surface proximate the cover body outer edge, each latching pin slot being elongated in a radial direction. The cover mounting mechanism may include a plurality of latching pin assemblies, and each latching pin assembly may correspond to one of the plurality of latching pin slots and include a latching pin extending through the latching pin slot with a latching pin tab end extending from the cover body outer surface, a latching pin finger coupled to the latching pin at a latching pin finger end opposite the latching pin tab end, a latching pin mounting bracket mounted to the cover body proximate the latching pin slot, the latching pin mounting bracket receiving the latching pin and constraining the latching pin to move between a latching pin unlocked position where the latching pin finger does not engage the wheel rib when the cover body inner surface is facing and engaging the wheel rib, and a latching pin locked position where the latching pin finger engages the wheel rib when the cover body inner surface is facing and engaging the wheel rib to retain the wheel rib between the latching pin finger and the cover body inner surface, and a latching pin spring engaging the latching pin and biasing the latching pin toward the latching pin locked position.

In another aspect of the present disclosure, a method for mounting a wheel cover assembly to a vehicle wheel having a wheel rim is disclosed. The method may include attaching a wheel rib having an annular shape to a rim inner surface of the wheel rim proximate an open end flange of the wheel rim having an open end flange inner diameter so that the wheel rib extends radially inward from the rim inner surface, positioning a cover body of the wheel cover assembly proximate the wheel rib, and engaging the wheel rib with a cover mounting mechanism when the cover body is facing the wheel rib so that the wheel cover assembly engages one of the wheel rib and the rim inner surface to retain the wheel rib between the cover mounting mechanism and the cover body to secure the wheel cover assembly to the vehicle wheel.

In some embodiments, attaching the wheel rib includes welding the wheel rib to the rim inner surface. In other embodiments, welding the wheel rib includes forming a weld around a circumference of the wheel rib. In further embodiments, attaching the wheel rib includes attaching a rib seal to the rim inner surface and attaching the wheel rib to the rib seal. In alternative embodiments, attaching the wheel rib includes attaching the wheel rib to the rim inner surface with an adhesive. In still further embodiments, attaching the wheel rib includes mounting a plurality of attachment blocks to the rim inner surface with the plurality of attachment blocks being circumferentially spaced about the rim inner surface, and attaching the wheel rib to the plurality of attachment blocks.

Additional aspects are defined by the claims of this patent.

BRIEF DESCRIPTION OF THE DRAWINGS

FIG. 9A is an isometric view of a first embodiment of a wheel cover assembly in accordance with the present disclosure that is mountable on the wheel rim of FIG. 1;

FIG. 9B is an enlarged isometric view of a portion of the wheel cover assembly of FIG. 9A;

FIG. 9C is an enlarged view of a portion of the wheel rim of FIG. 1 and a corresponding portion of the wheel cover assembly of FIG. 9A;

FIG. 11A is an isometric view of a third embodiment of a wheel cover assembly in accordance with the present disclosure that is mountable on the wheel rim of FIG. 1;

FIG. 11B is an enlarged view of a portion of the wheel rim of FIG. 1 and a corresponding portion of the wheel cover assembly of FIG. 11A with a locking latch in a latch unlocked position;

FIG. 11C is the enlarged view of FIG. 11B with the locking latch in a latch locked position;

FIG. 16A is a side view of an eighth embodiment of a cover body in accordance with the present disclosure in an open position FIG. 16B is the side view of the cover body of FIG. 16A in a closed position;

FIG. 17A is an exploded view of the wheel rim of FIG. 1 and a ninth embodiment of a wheel cover assembly in accordance with the present disclosure mounted on the wheel rim of FIG. 1

FIG. 17B is an enlarged view of a portion of the wheel rim of FIG. 1 and a corresponding portion of the wheel cover assembly of FIG. 17A mounted to the wheel rim;

DETAILED DESCRIPTION

Figure 2:
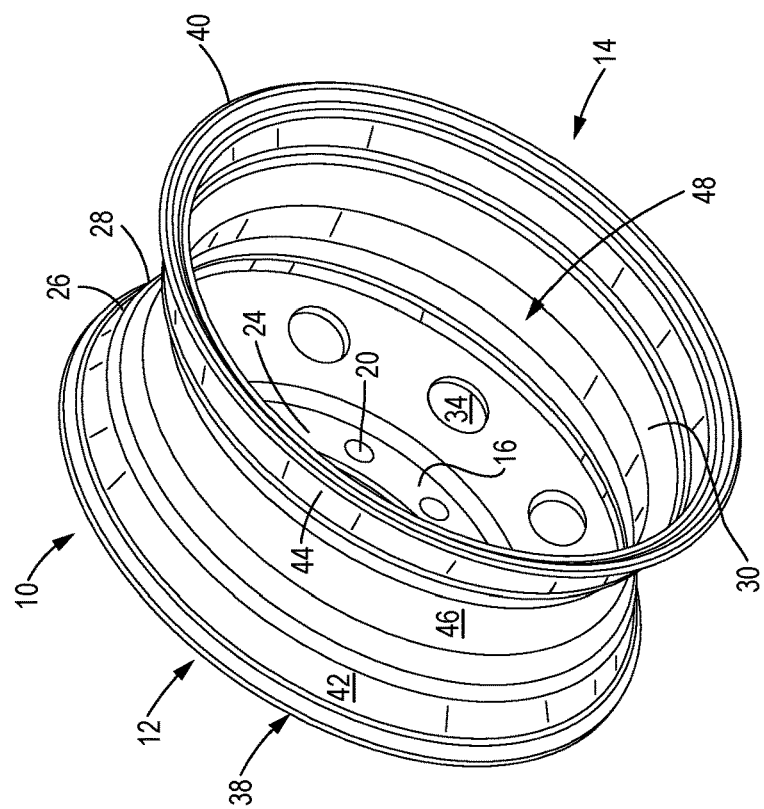
FIG. 2 is a perspective view from an open end of the wheel rim of FIG. 1.
Figure 1:
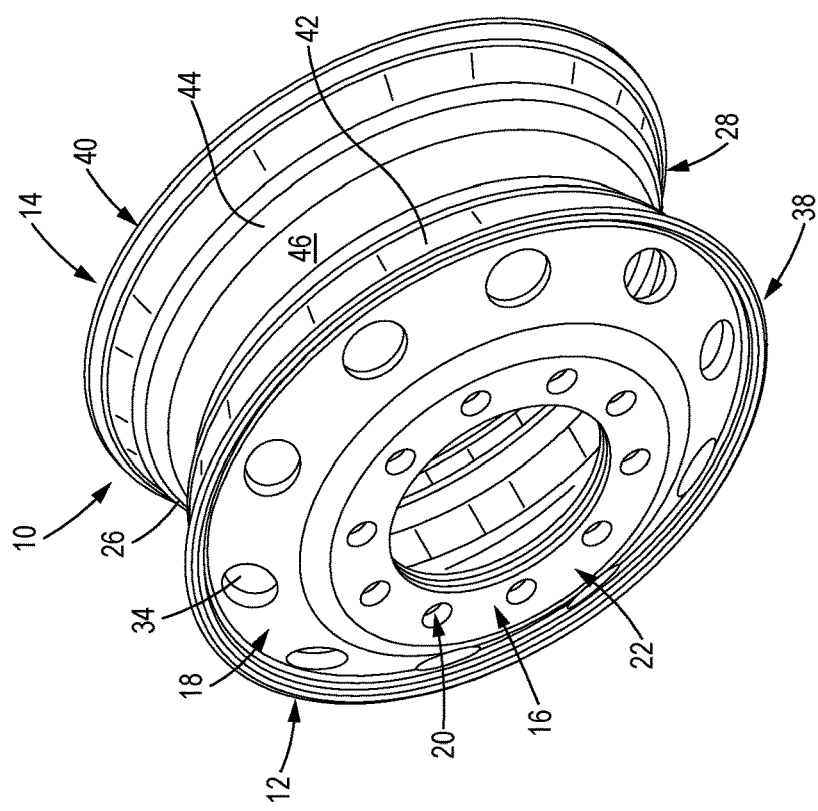
FIG. 1 is a perspective view from a disc or closed end of a wheel rim of a vehicle in which wheel cover assemblies in accordance with the present disclosure may be implemented.
Figure 4:
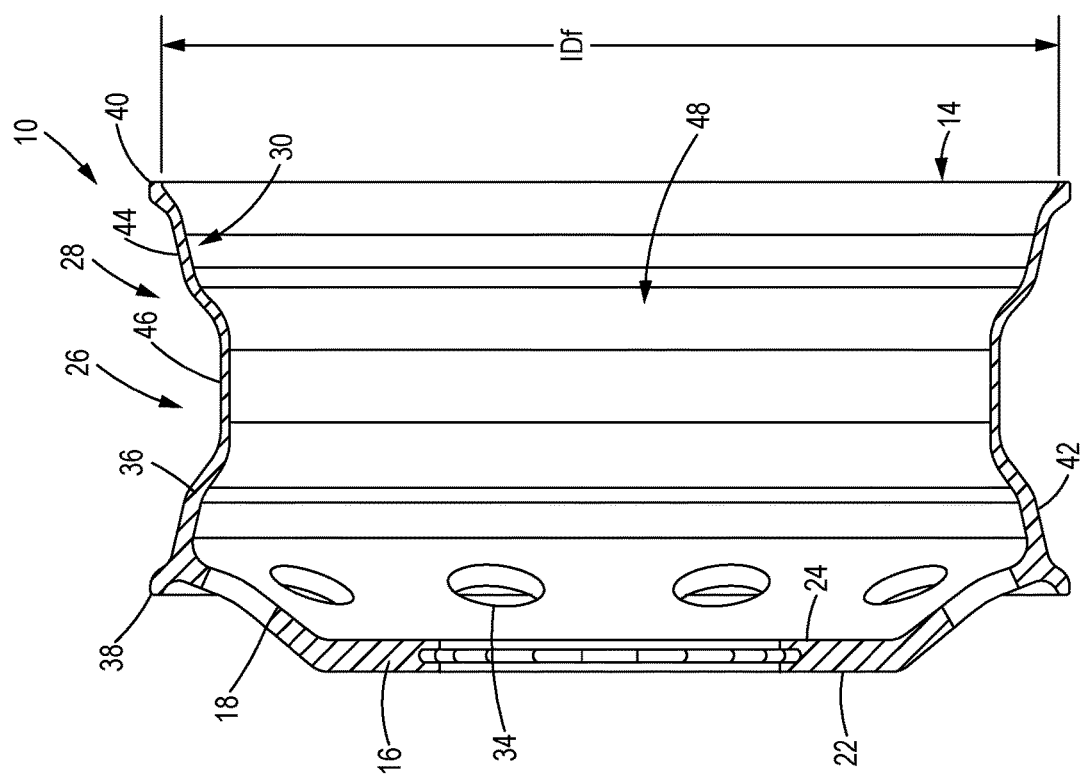
FIG. 4 is a cross-sectional view of the wheel rim of FIG. 1 taken through line 4-4 of FIG. 3.
Figure 3:
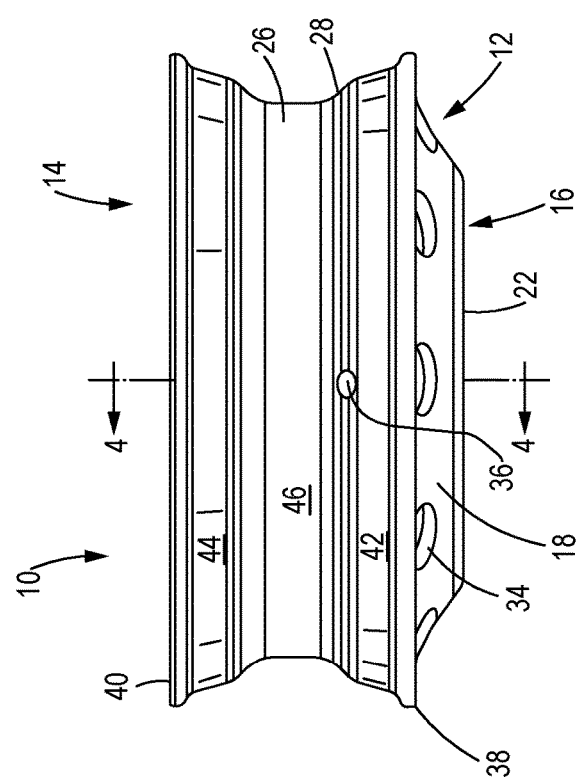
FIG. 3 is a side view of the wheel rim of FIG. 1.

FIGS. 1-4 illustrate a vehicle wheel 10 having a disc end 12 and an opposing open end 14 at which aerodynamic wheel cover assemblies in accordance with various embodiments of the present disclosure may be mounted. The vehicle wheel 10 can include a mount flange 16 at the disc end 12 extending radially inward from a disc face 18 for mounting the vehicle wheel 10 to a wheel hub (not shown). The mount flange 16 can include one or more bolt holes 20 extending there through for bolting or otherwise fastening the vehicle wheel 10 to the wheel hub. As shown in FIGS. 1, 3 and 4, the mount flange 16 can include a substantially planar outer face 22 for providing a stable bearing surface for engagement with one or more wheel nuts of one or more bolts when the vehicle wheel 10 is bolted to the wheel hub. As shown in FIGS. 2 and 4, the mount flange 16 can also include a substantially planar inner face 24 for providing a stable bearing surface for engagement with the wheel hub when the vehicle wheel 10 is bolted to the wheel hub.

The vehicle wheel 10 can also include a wheel rim 26 having an annular shape extending between the disc face 18 and the open end 14, and having a rim outer or tire surface 28 contoured to engage a tire disposed thereon, and a rim inner surface 30 opposite the rim outer surface 28. It will be apparent to those skilled in the art in view of this disclosure that other vehicle wheel configurations can be used in accordance with various embodiments. In some embodiments (not shown), the mount flange 16 and the disc face 18 can be positioned between the two ends 12, 14 of the vehicle wheel 10 inward of the disc end 12.

As further shown in FIGS. 1, 3 and 4, the disc face 18 extends substantially conically between the mount flange 16 and the wheel rim 26 for providing a transition and structural support between the wheel rim 26 and the mount flange 16. However, it will be apparent in view of this disclosure that the disc face 18 may not be conical and can instead extend radially between the mount flange 16 and the wheel rim 26. The disc face 18 can include one or more hand holes 34 extending there through for permitting handling of the vehicle wheel 10, for providing cooling ventilation to a brake or brakes proximate the vehicle wheel 10, and/or for providing accessibility to a valve hole 36 (FIGS. 3 and 4) for inflation and valve installation. Although the disc face 18 is shown in FIGS. 1-4 as having 10 hand holes 34, it will be apparent that any appropriate number and/or size and/or shape for the hand holes 34 can be used.

The wheel rim 26 in accordance with the present disclosure can be configured for mounting a tire thereto. The rim outer side 28 of the wheel rim 26 can include a disc end flange 38 at the disc end 12, an open end flange 40 at the open end 14, a first angle wall 42 extending from the disc end flange 38 toward the open end flange 40, a second angle wall 44 extending from the open end flange 40 toward the disc end flange 38, and a drop well 46 connecting the first angle wall 42 to the second angle wall 44. The valve hole 36 of the wheel rim 26 can extend through the first angle wall 42, the second angle wall 44 or the drop well 46 so that an inflation valve (not shown) is conveniently accessible through the open end 14. The first angle wall 42, the second angle wall 44 and the drop well 46 can be sized and shaped to have a tire side profile geometry conforming to the Tire and Rim Association Standard for drop center rims and flat base rims. The valve hole 36 can be any size, shape, configuration and orientation suitable for installation of an inflation valve therein.

The disc end flange 38 and the open end flange 40 can each generally be sized and shaped to have a profile geometry on the rim outer surface 28 of the wheel rim 26 conforming to the Tire and Rim Association Standard for drop center rims and flat base rims. In some embodiments, particular profiles of the tire side and the inner side of the disc end flange 38 and the open end flange 40 can be configured within the Tire and Rim Association Standard for drop center rims and flat base rims to assist in achieving desired load ratings and tire pressure ratings at a reduced weight without increasing the risk of the tire demounting from the wheel rim 26. In alternative embodiments, the disc end flange 38 and the open end flange 40 can include different tire side and/or inner side profile patterns while conforming to the Tire and Rim Association Standards.

In the typical vehicle wheel 10 as illustrated and described, the mount flange 16 and the wheel rim 26 define a generally cylindrical wheel cavity 48 (FIGS. 2 and 4), with the open end 14 opening outward of the vehicle. The open end 14 exposes the wheel cavity 48 to the airstream flow past the vehicle. As the vehicle accelerates to highway speeds, the airflow past and through the wheel cavity 48 can create drag that reduces the fuel efficiency of the vehicle, and noise that can be annoying to the driver, other motorists and to others in the vicinity of the vehicle. The noise and drag can be reduced, and the appearance of the wheel and the vehicle may be enhanced, by the installation of wheel cover assemblies in accordance with the present disclosure.

Figure 5A:
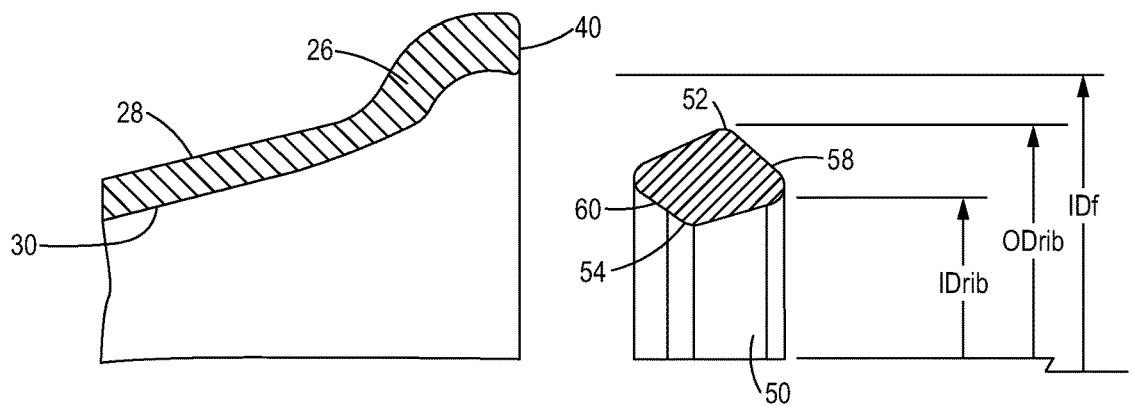
FIG. 5A is an enlarged cross-sectional view of a portion of the wheel rim of FIGS. 1-4 and an installable wheel rib in accordance with the present disclosure.
Figure 5B:
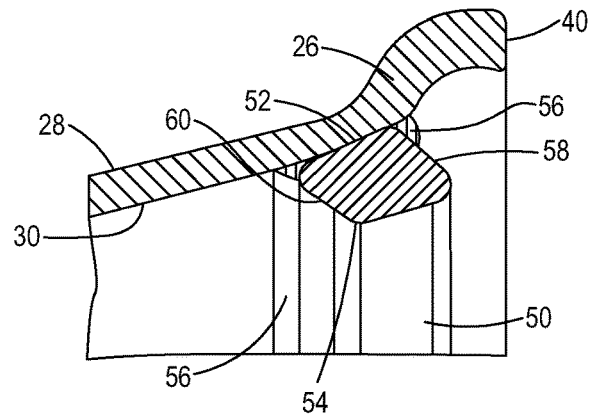
FIG. 5B is the enlarged cross-sectional view of FIG. 5A with the installable wheel rib welded to a rim inner surface of the wheel rim.
Figure 5C:
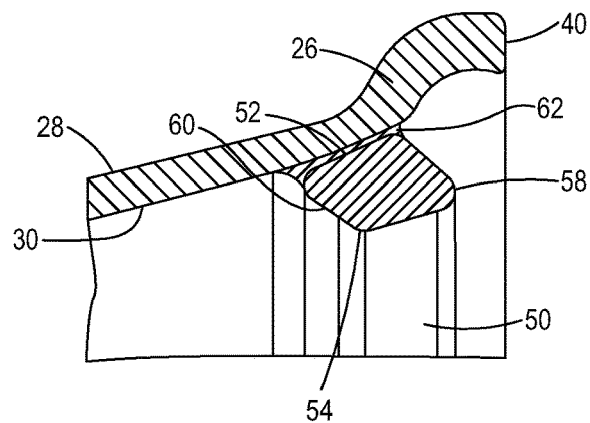
FIG. 5C is the enlarged cross-sectional view of FIG. 5A with the installable wheel rib attached to the rim inner surface of the wheel rim with a rib seal in accordance with the present disclosure.

The rim inner surface 30 as shown is relatively smooth and continuous such that the rim inner surface 30 may not facilitate attachment of a covering device at the open end 14. Referring to FIGS. 5A-5C, wheel cover assemblies in accordance with the present disclosure may include an installable wheel rib 50 that can be attached to the wheel rim 26 to provide a structure for attaching wheel covers via cover mounting mechanisms as described further hereinafter. Though only partially illustrated in FIGS. 5A-5C, those skilled in the art will understand that the installable wheel rib 50 has an annular shape with a rib outer diameter ODrib (FIG. 5A) defined by a rib outer edge 52 that is less than an open end flange inner diameter IDf (FIGS. 4 and 5A), and a rib inner diameter IDrib (FIG. 5A) defined by a rib inner edge 54. The installable wheel rib 50 may be inserted into the wheel rim 26 with the rib outer edge 52 proximate the rim inner surface 30. Once aligned within the wheel rim 26, the wheel rib 50 may be affixed to the rim inner surface 30 by an appropriate attachment mechanism.

In the embodiment illustrated in FIG. 5B, the wheel rib 50 is rigidly secured to the rim inner surface 30 by inner and/or outer welds 56. The wheel rib 50 may be inserted into the wheel rim 26 until the rim inner surface 30 narrows to the point that the entire circumference of the rib outer edge 52 is disposed proximate the rim inner surface 30. The welds 56 can be made at the intersection of a rib outward face 58 with the rim inner surface 30, at the intersection of a rib inward face 60 with the rim inner surface 30, or both, depending on what is necessary to rigidly secure the wheel rib 50 to the rim inner surface 30. The welds 56 may be continuous around the circumference of the wheel rib 50 as illustrated, or may be a series of spot welds 56 circumferentially spaced about the rib outer edge 52 if spot welds 56 are sufficient to secure the wheel rib 50 to the rib inner surface 30 without detaching as the vehicle wheel 10 is used on the vehicle.

Alternative mechanical or adhesive fastening mechanisms may be used to secure the wheel rib 50 to the rim inner surface 30. For example, FIG. 5C illustrates the wheel rib 50 fastened to the rim inner surface 30 by a rib seal 62 fabricated from a resilient material such as, for example, polymer or polymeric materials, including rubber (e.g., vulcanized rubber), plastics, and/or combinations thereof, and interposed between the rim inner surface 30 and the wheel rib 50. The rib seal 62 may be attached to the rim inner surface 30 and the rib outer edge 52 by appropriate rubber-to-substrate adhesives, such as contact adhesives, pressure sensitive adhesives, multi-component adhesives, and synthetic adhesives based on elastomers, thermoplastics, emulsions, and thermosets like epoxy, polyurethane, cyanoacrylate and acrylic polymers, and the like, and attachment processes known in the art for affixing resilient materials such as vulcanized rubber to metallic surfaces. Such processes may include compression of the rib seal 62 and application of heat to ensure high bond strength between the resilient material of the rib seal 62 and the surfaces of the wheel rim 26 and the wheel rib 50. Such resilient materials, adhesives, methods and processes will be apparent to those skilled in the art and are contemplated by the inventors as having use in securing wheel cover assemblies in accordance with the present disclosure to the wheel rims 26.

In further alternative embodiments, the rib outer edge 52 of the wheel rib 50 can be attached directly to the rim inner surface 30 by an appropriate structural adhesive (FIG. 8B), such as a cured epoxy. Curing of the epoxy resin may be achieved by reacting an epoxy with itself through homopolymerisation, or by forming copolymers using polyfunctional hardeners such as amines, anhydrides, phenols or thiols. Appropriate adhesives and curing methods will be apparent to those skilled in the art, and their use in attaching the wheel rib 50 to the rim inner surface 30 is contemplated by the inventors.

Figure 6A:
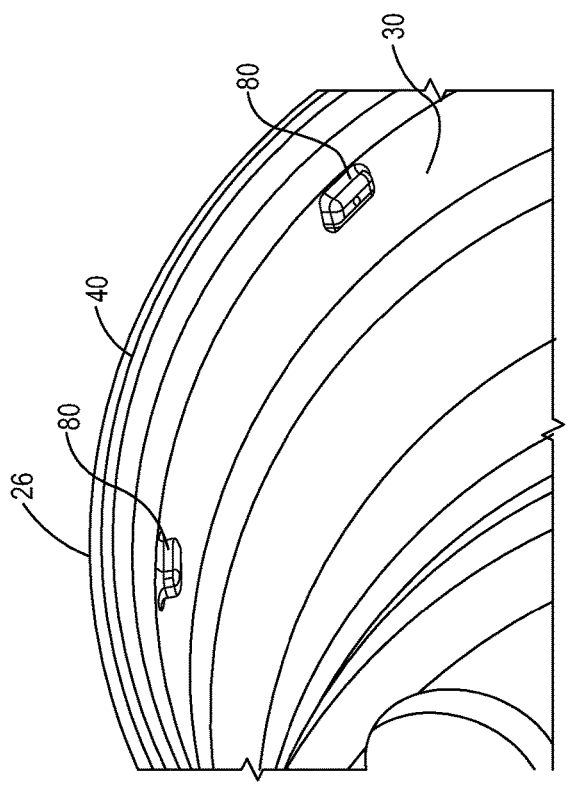
FIG. 6A is an enlarged isometric view of a portion of the wheel rim of FIGS. 1-4 with an embodiment of attachment blocks in accordance with the present disclosure mounted on the rim inner surface of the wheel rim.
Figure 6B:
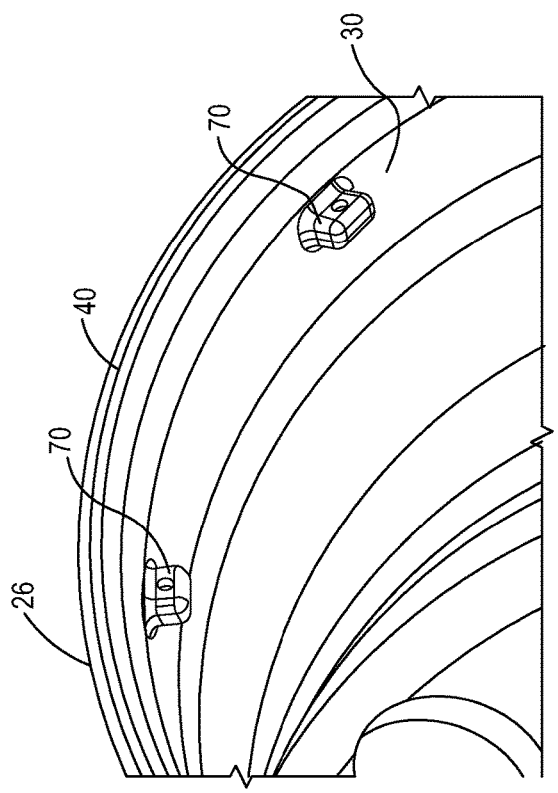
FIG. 6B is an enlarged cross-sectional view of a portion of the wheel rim of FIGS. 1-4 and the installable wheel rib of FIGS. 5A-5C mounted to the attachment blocks of FIG. 6A.

In addition to utilizing the rib seal 62 to connect the wheel rib 50 to the rim inner surface 30 as shown in FIG. 5C, other mechanisms for indirectly connecting the wheel rib 50 are contemplated by the inventors. FIGS. 6A and 6B illustrate an embodiment where a plurality of attachment blocks 70 are mounted on the rim inner surface 30, and the wheel rib 50 is attached to the attachment blocks 70. As shown in FIG. 6A, the attachment blocks 70 may be circumferentially spaced about the rim inner surface 30. In this embodiment, the attachment blocks 70 have block outer faces 72 (FIG. 6B) that face and engage the rim inner surface 30, and welds 56 as described above can be made between the block outer face 72 and the rim inner surface 30. With the attachment blocks 70 anchored to the rim inner surface 30, the wheel rib 50 may be installed with the rib inward face 60 facing and engaging block outward faces 74 of the attachment blocks 70. The attachment blocks 70 may be disposed inward on the rim inner surface 30 from the location at which the wheel rib 50 is mounted, such as that shown in FIGS. 5B and 5C, so that the wheel rib 50 is properly positioned relative to the open end flange 40 for attachment of the wheel cover assemblies as illustrated and described below. If necessary, the attachment blocks 70 may be shaped so that the block outer faces 72 are complimentary to the portions of the rim inner surface 30 to which they are attached so that the block outer faces 74 are generally parallel to the open end flange 40. Threaded fasteners 76 are used to attach the wheel rib 50 to the attachment blocks 70 in the illustrated embodiment, but those skilled in the art will understand that any appropriate attachment mechanism may be used such as alternative fasteners, welds, structural adhesives and the like.

Figure 7A:
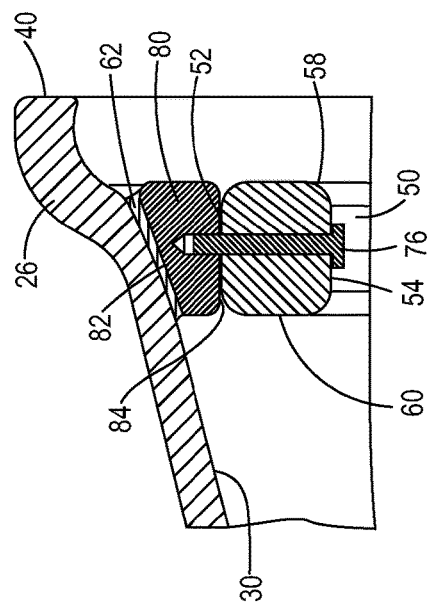
FIG. 7A is an enlarged isometric view of a portion of the wheel rim of FIG. 1-4 with an alternative embodiment of attachment blocks in accordance with the present disclosure mounted on the rim inner surface of the wheel rim.
Figure 7B:
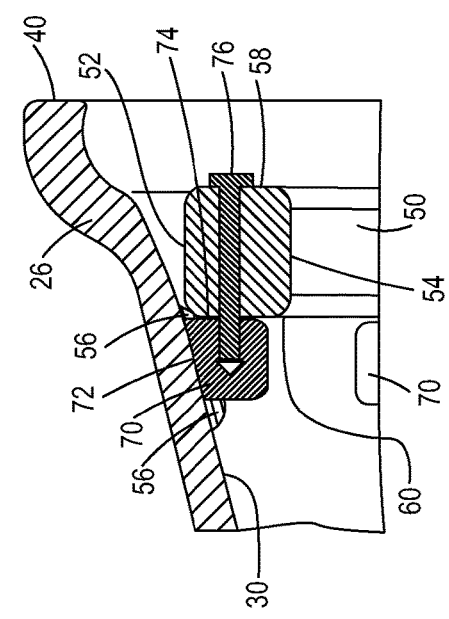
FIG. 7B is an enlarged cross-sectional view of a portion of the wheel rim of FIGS. 1-4 and the installable wheel rib of FIGS. 5A-5C mounted to the attachment blocks of FIG. 7A.

FIGS. 7A and 7B illustrate an alternative embodiment where a plurality of attachment blocks 80 are mounted on the rim inner surface 30 in approximately the same position inward from the open end flange 40 as the wheel rib 50 in FIGS. 5B and 5C. The attachment blocks 70 are circumferentially spaced about the rim inner surface 30 as shown in FIG. 7A, and block outer faces 82 (FIG. 7B) of the attachment blocks 80 are mounted on the rim inner surface 30 by rib seals 62 in the manner described above. In this embodiment, the wheel rib 50 may be installed with the rib outer edge 52 facing and engaging block inner faces 84 of the attachment blocks 80 and secured thereto with an appropriate attachment mechanism such as the threaded fasteners 76 as shown. The wheel rib 50 is installed in the proper position without the necessity of shifting the attachment blocks 80 inward into the wheel rim 26 as was necessary for the attachment blocks 70 in the embodiment of FIGS. 6A and 6B. However, the mounting arrangement may necessitate the wheel rib 50 having a small rib outer diameter ODrib than in the embodiments of FIGS. 5B, 5C and 6B to accommodate the space occupied by the attachment blocks 80. In this case, mounting mechanisms of the wheel cover assemblies described below may be adjusted accordingly to allow for the diametrically smaller wheel rib 50.

When installed, the wheel rib 50 extends radially inward from the rim inner surface 30 of the wheel rim 26. It will further be apparent in view of this disclosure that the wheel rib 50 can be formed in any size and/or shape that is compliant with brake clearance requirements and facilitates attachment of the wheel cover assemblies as described herein to the vehicle wheel 10. FIGS. 8A-8G illustrate various alternative installable wheel ribs 50a-50g having varying cross-sectional geometries that may be installed on the wheel rim 26 depending on the design requirements for a particular implementation. Each wheel rib 50a-50g has a rib outer edge 52a-52g, respectively, facing the rim inner surface 30 and defining the rib outer diameter ODrib (FIG. 5A), a rib inner edge 54a-54g, respectively, defining the rib inner diameter IDrib (FIG. 5A), a rib outward face 58a-58g, respectively, facing the open end 14 of the wheel rim 26, and a rib inward face 60a-60g, respectively, opposite the corresponding rib outward face 58a-58g. The rib inner edges 54a-54g, the rib outward faces 58a-58g and the rib inward faces 60a-60g have varying shapes to change the cross-sectional geometries of the wheel ribs 50a-50g as shown in FIGS. 8A-8G. Within the context of aerodynamic wheel cover assemblies in accordance with the present disclosure described herein, cover mounting mechanisms can be configured to engage the various wheel ribs 50a-50g and other wheel rib shapes to retain the wheel cover assemblies on the wheel rims 26.

Figure 8A:
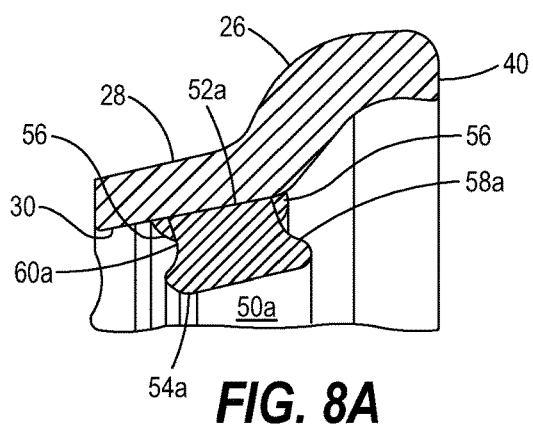
FIGS. 8A-8G are enlarged cross-sectional views of portions of the wheel rim of FIGS. 1-4 illustrating various configurations of the installable wheel rib of FIGS. 5A-5C on the rim inner surface of the wheel rim.
Figure 8B:
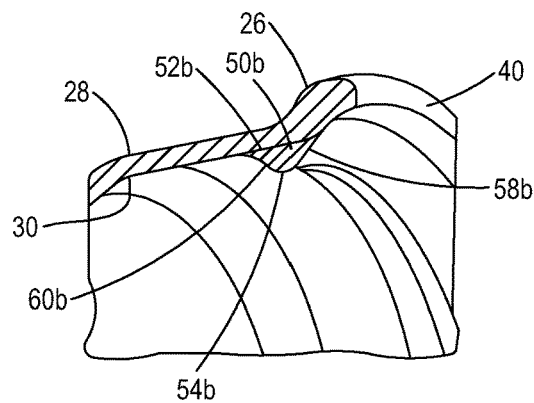
Figure 8C:
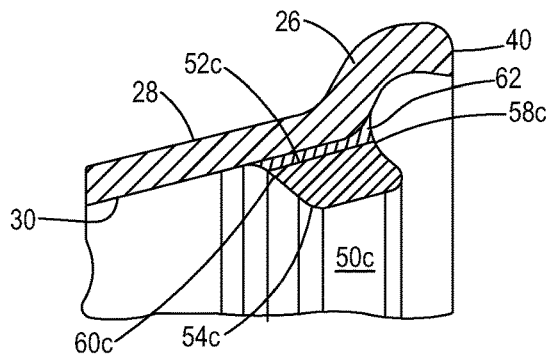
Figure 8D:
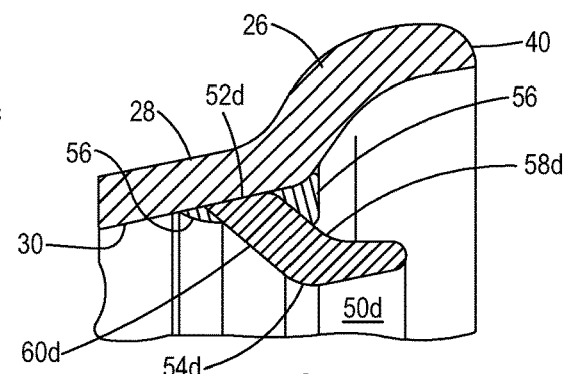
Figure 8E:
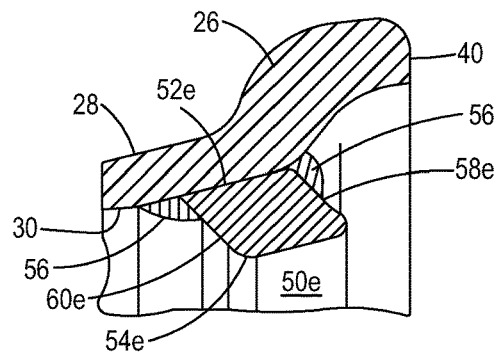
Figure 8F:
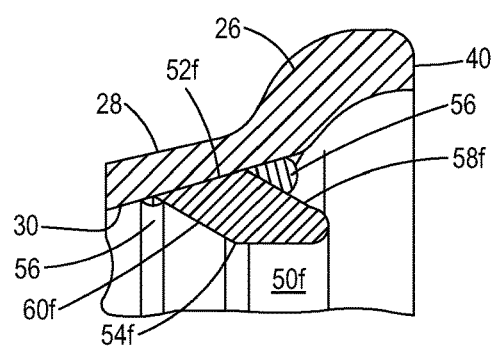
Figure 8G:
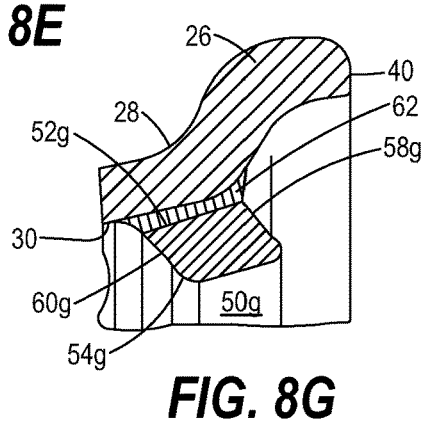

FIGS. 8A-8G also illustrate some of the wheel rib attachment mechanisms contemplated by the inventors. Wheel ribs 50a and 50d-50f in FIGS. 8A and 8D-8F, respectively, are attached to the rim inner surface 30 by welds 56 as illustrated and described above in relation to FIG. 5B. Wheel ribs 50c and 50g in FIGS. 8C and 8G, respectively, are attached to the rim inner surface 30 by rib seals 62 as illustrated and described above in relation to FIG. 5C. The wheel rib 50b in FIG. 8B is attached to the rim inner surface 30 by a structural adhesive such as a cured epoxy as described above. Further alternative attachment mechanisms may be apparent to those skilled in the art and are contemplated by the inventors as having use for attaching wheel ribs 50 in wheel cover assemblies in accordance with the present disclosure.

As discussed above, the shape of the wheel rim 26 and the outboard open end 14 define a cavity within the wheel rim 26 and create an aerodynamic discontinuity that causes turbulence in the airstream flow past the side of the vehicle. The turbulence creates unwanted noise and drag that are undesirable and can reduce the fuel efficiency of the vehicle. Aerodynamic wheel cover assemblies in accordance with the present disclosure are mounted to the wheel rim 26 over the open end 14 to present a more continuous surface to the airstream flow and reduce turbulence in the flow. The wheel cover assemblies include cover mounting mechanisms that engage the wheel rib 50 to hold the wheel cover assemblies in place. The cover mounting mechanisms may have generic configurations that can engage a subset of the wheel ribs 50a-50g or wheel ribs 50 having other cross-sectional shapes, or may have custom configurations that can engage a specific one or few of the wheel ribs 50a-50g. The following examples illustrate the aerodynamic wheel cover assembly embodiments with particular wheel ribs 50, but those skilled in the art will understand that shape variations can be made to match other stiffener rib shapes. Such variations are contemplated by the inventors.

First Wheel Cover Assembly Embodiment

FIGS. 9A-9C illustrate a first embodiment of a wheel cover assembly 100 in accordance with the present disclosure. The wheel cover assembly 100 as illustrated includes a cover body 102 and a cover mounting mechanism 104. The cover body 102 has a circular shape, a cover body outer surface 106 (FIG. 9C), and a cover body inner surface 108 opposite the cover body outer surface 106. A cover body outer edge 110 has a cover body outer diameter ODc that is less than the open end flange inner diameter IDf so that the cover body 102 can be inserted through the open end flange 40, and is greater than the rib inner diameter IDrib so that the cover body 102 cannot pass through the wheel rib 50. The cover body 102 can be fabricated from any appropriate material or combination of materials, such as metals, plastics, polymers, ceramics, rubber or the like, to achieve desired functional and aesthetic properties. In particular embodiments, the cover body 102 may be formed from aluminum, stainless steel, chrome-plated plastic, acrylonitrile butadiene styrene (ABS) plastics, and the like. Moreover, the cover body outer surface 106 can be configured or treated to provide desired functional performance (e.g., aerodynamic properties that minimize drag) and aesthetic appearance when installed on the vehicle wheel 10. Surface treatments can include surface finishing such as DuraBright® surface finishing, surface texturing, application of paint, or other coating, or the like.

The cover mounting mechanism 104 of the wheel cover assembly 100 includes rib engaging elements in the form of a plurality of locking arms 112 extending from the cover body inner surface 108 and circumferentially spaced about the cover body inner surface 108 proximate the cover body outer edge 110. Each locking arm 112 may have a locking arm circumferential length CLa (FIG. 9A) and be separated from each adjacent locking arm 112 by a locking arm gap 114 having a gap circumferential length CLg. In the illustrated embodiment, the gap circumferential length CLg is greater than the locking arm circumferential length CLa, but the circumferential links CLa, CLg could be equal or the locking arm circumferential length CLa may be greater than the gap circumferential length CLg depending on the implementation. The locking arms 112 may be attached to the cover body inner surface 108 with an appropriate attachment mechanism such as adhesive, welds, fasteners or the like. Alternatively, the cover body inner surface 108 may have a plurality of mounting tabs 116 extending from the cover body inner surface 108, with each mounting tab 116 corresponding to one of the locking arms 112 and being received by and engaging the locking arm 112 to secure the locking arm 112 to the cover body 102. In further alternatives as described below, the locking arms 112 may be integrally formed with the cover body 102.

As shown in greater detail in FIGS. 9B and 9C, each locking arm 112 has a locking arm body 118 extending from the cover body inner surface 108. The locking arm body 118 has a body proximal end 120 connected at the cover body inner surface 108 and extends to a body distal end 122 opposite the body proximal end 120. A locking arm detent 124 extends radially outward from the locking arm body 118 proximate the body distal end 122, and may include a detent camming surface 126 at the body distal end 122. The radially outer surfaces of the locking arm detents 124 define a cover mounting mechanism outer diameter ODm (FIG. 9A) that is greater than the rib inner diameter IDrib.

The wheel cover assembly 100 is installed on the wheel rim 26 by overcoming an overlap between the wheel rib 50 and the locking arm detents 124. The detent camming surfaces 126 of the locking arm detents 124 are engaged by the rib outward face 58 of the wheel rib 50 when the wheel cover assembly 100 is placed against the wheel rib 50 and the locking arms 112 are in the normal locking position or rib engaging position shown in FIGS. 9A-9C. Application of additional force on the cover body outer surface 106 causes the locking arm bodies 118 to deflect radially inward toward a rib disengaging position with the cover mounting mechanism outer diameter ODm defined by the radial outer surfaces being less than the rib inner diameter IDrib as the locking arm detents 124 are forced past the wheel rib 50. The locking arm gaps 114 allow the locking arms 112 to deflect inward without engaging each other. When the locking arm detents 124 move past the wheel rib 50 and are disposed on the opposite side of the wheel rib 50 from the cover body 102 at the rib inward face 60, restorative forces in a resilient material from which the locking arm bodies 118 are formed cause the locking arm bodies 118 to deflect radially outward toward the locking position. When the cover body inner surface 108 is proximate the rib outward face 58 as shown in FIG. 9C, the wheel rib 50 is retained between the locking arm detents 124 and the cover body inner surface 108 to retain the wheel cover assembly 100 and the wheel rim 26. The wheel cover assembly 100 can be removed by prying the cover body 102 away from the open end flange 40 and forcing the locking arm detents 124 past the wheel rib 50.

The locking force of the cover mounting mechanism 104 may be enhanced by biasing the locking arms 112 radially outward toward their locking positions. In one embodiment, an annular tension ring 128 may be installed on a radially inward side of the locking arms 112. The tension ring 128 may engage radial inner surfaces 130 of the locking arm bodies 118. Tension ring grooves 132 may be defined in the radial inner surfaces 130 to retain and align the tension ring 128 relative to the locking arms 112. The tension ring 128 is fabricated from a resilient material so that the tension ring 128 can deflect radially inward with the locking arms 112 due to engagement with the wheel rib 50, and then deflect radially outward to force the locking arm body 118 into tighter engagement with the rib inner edge 54. The tension ring 128 may include a tension ring opening 134 to allow the inward deflection of the tension ring 128. As shown, the tension ring grooves 132 approximately radially align the tension ring 128 with the rib inner edge 54 or toward the side of the rib inward face 60 when the wheel cover assembly 100 is installed on the wheel rim 26. Those skilled in the art will understand that other tensioning mechanisms may be implemented with the wheel cover assembly 100 in accordance with the present disclosure, and such alternatives are contemplated by the inventors.

Second Wheel Cover Assembly Embodiment

Figure 10A:
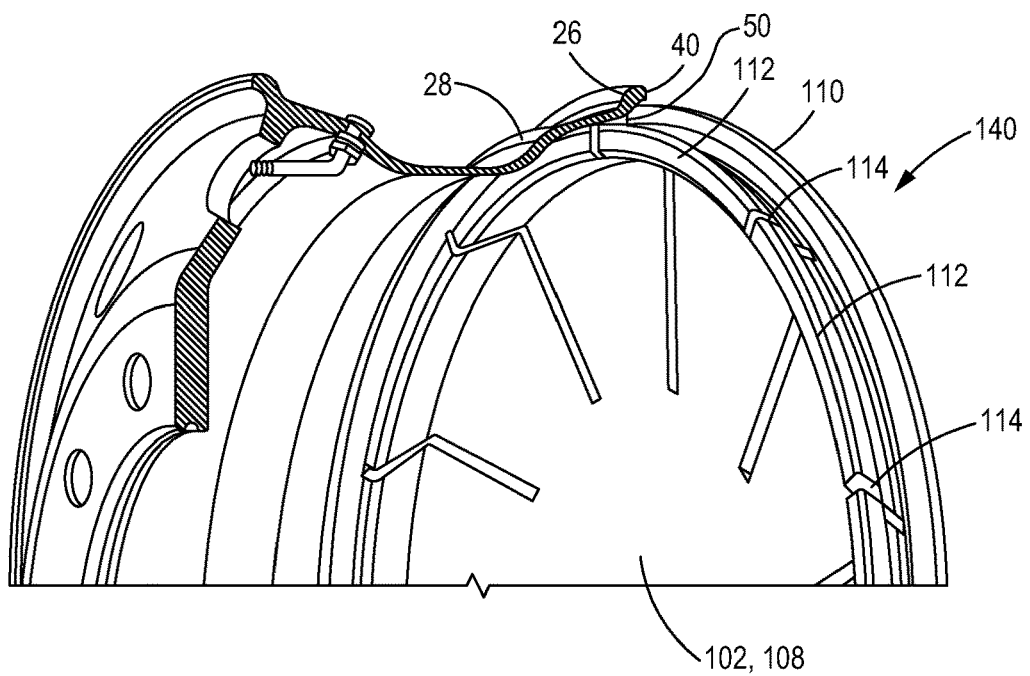
FIG. 10A is an enlarged isometric view of a portion of the wheel rim of FIG. 1 and a second embodiment of a wheel cover assembly in accordance with the present disclosure that is mountable on the wheel rim of FIG. 1.
Figure 10B:
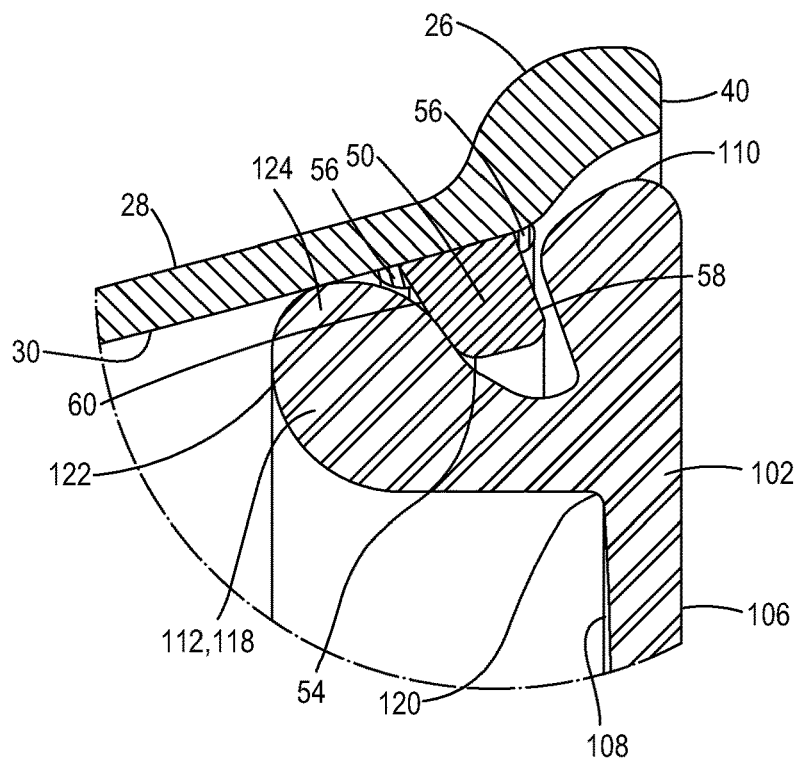
FIG. 10B is an enlarged view of a portion of the wheel rim of FIG. 1 and a corresponding portion of the wheel cover assembly of FIG. 10A.

FIGS. 10A and 10B illustrate a modification of a wheel cover assembly 140 where the cover body 102 and the locking arms 112 of the cover mounting mechanism 104 are integrally formed as a single unitary component. In this embodiment and others illustrated and described herein, similar structures are identified with the same reference numerals. The integral cover body 102 and the locking arms 112 may be fabricated from a material that is resilient enough to allow the locking arms 112 to deflect radially inward, while at the same time having sufficient stiffness to prevent the wheel cover assembly 140 from detaching from the wheel rib 50 under normal operating conditions for the vehicle wheel 10. For example, the cover body 102 and the locking arms 112 may be molded from an elastomeric material, including polymers, plastics and rubber (e.g., heavy durometer rubber).

The wheel cover assembly 140 illustrates additional variations of the wheel cover assembly 100. For example, the tension ring 128 is omitted in the illustrated embodiment, but the tension ring 128 or an alternative tensioning mechanism could be included if needed. Further, the locking arms 112 in the wheel cover assembly 140 have a locking arm circumferential length CLa that is greater than the gap circumferential length CLg of the locking arm gaps 114 there between. The locking arm gaps 114 are still large enough to prevent the locking arms 112 from engaging each other when the locking arms 112 deflect radially inward during installation.

Third Wheel Cover Assembly Embodiment

FIGS. 11A-11C illustrate an alternative embodiment of a wheel cover assembly 150 formed by the cover body 102 and a cover mounting mechanism 152 with rib engaging elements in the form of a plurality of locking latches 154. The cover body 102 is modified to include a plurality of latch recesses 156 defined in the cover body outer surface 106 and spaced circumferentially about the cover body outer surface 106 proximate the cover body outer edge 110 as shown in FIG. 11A. Each of the latch recesses 156 includes a latch opening 158 (FIGS. 11B and 11C) extending through the cover body 102 from the corresponding latch recess 156 to the cover body inner surface 108. Each locking latch 154 is installed in a corresponding one of the latch recesses 156. The locking latch 154 includes a latch arm 160 on the side of the cover body outer surface 106 of the cover body 102, and a latch finger 162 extending through the latch opening 158 to the cover body inner surface 108. The locking latches 154 are operatively connected to the cover body 102 so that the locking latches 154 move between a latch unlocked or rib disengaging position (FIG. 11B) and a latch locked or rib engaging position (FIG. 11C). In the latch unlocked position, the latch finger 162 does not engage the wheel rib 50 when the cover body inner surface 108 is facing and engaging the rib outward face 58. With the locking latches 154 in their latch unlocked positions, the cover mounting mechanism outer diameter ODm defined by the latch fingers 162 is less than the rib inner diameter IDrib so that the latch fingers 162 can be inserted past the wheel rib 50. Once the cover body 102 is in place as shown in FIG. 11B, the locking latches 154 can be moved to the latch locked position of FIG. 11C where the latch fingers 162 engage the rib inward face 60 of the wheel rib 50 to capture the wheel rib 50 between the latch fingers 162 and the cover body inner surface 108. The latch recesses 156 may include a latch locking mechanism or surface contour 164 that engages the latch arms 160 in the latch locked position to prevent the locking latches 154 from moving to the latch unlocked position during normal operation of the vehicle and detaching the wheel cover assembly 150 from the wheel rim 26.

In the illustrated embodiment, each locking latch 154 is attached to the cover body 102 by a latch pivot pin 166 that creates a locking latch axis 168 about which the locking latch 154 rotates between the latch unlocked position and the latch locked position. The locking latch axis 168 lies within a plane of the cover body 102 so that the locking latches 154 rotate as shown. In alternative embodiments, the latch recesses 156 and connections of the locking latches 154 may be modified so that the locking latches 154 rotate about locking latch axes 168 that are angled/orthogonal (e.g., perpendicular) relative to the plane of the cover body 102. In other embodiments, the locking latches 154 and the latch recesses 156 may be configured so that the locking latches 154 is slidably connected to the cover body 102 and move through a linear path between the latch unlocked positions and the latch locked positions. Other connection arrangements where the locking latches 154 move through linear, angled, circular or more complex paths of motion are contemplated.

Fourth Wheel Cover Assembly Embodiment

Figure 12A:
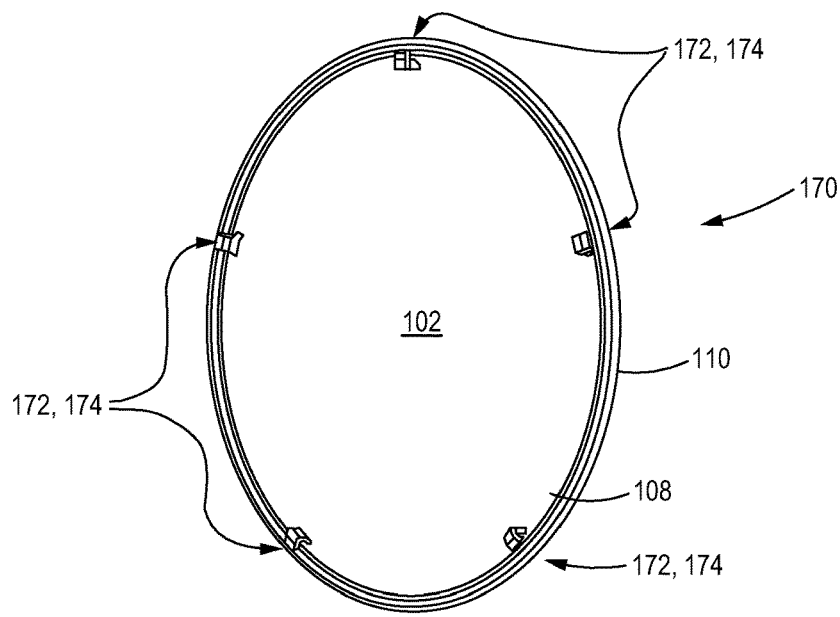
FIG. 12A is an isometric view of a fourth embodiment of a wheel cover assembly in accordance with the present disclosure that is mountable on the wheel rim of FIG. 1.
Figure 12B:
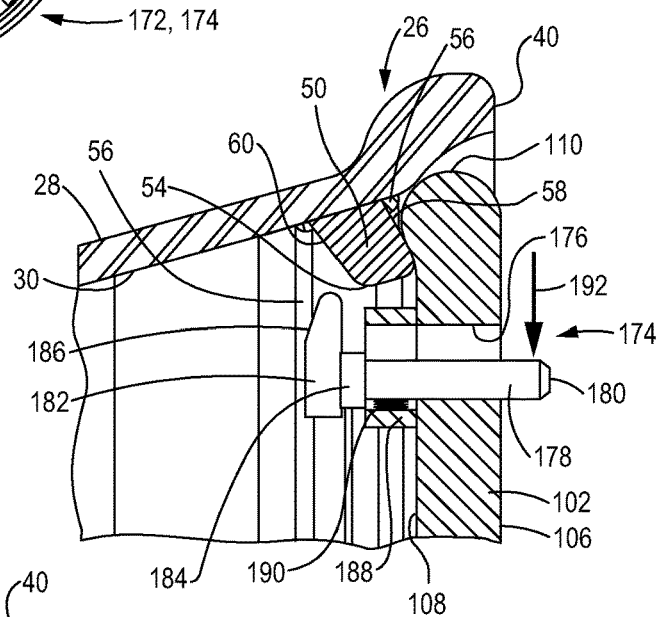
FIG. 12B is an enlarged view of a portion of the wheel rim of FIG. 1 and a corresponding portion of the wheel cover assembly of FIG. 12A with a latching pin assembly in a latching pin unlocked position.
Figure 12C:
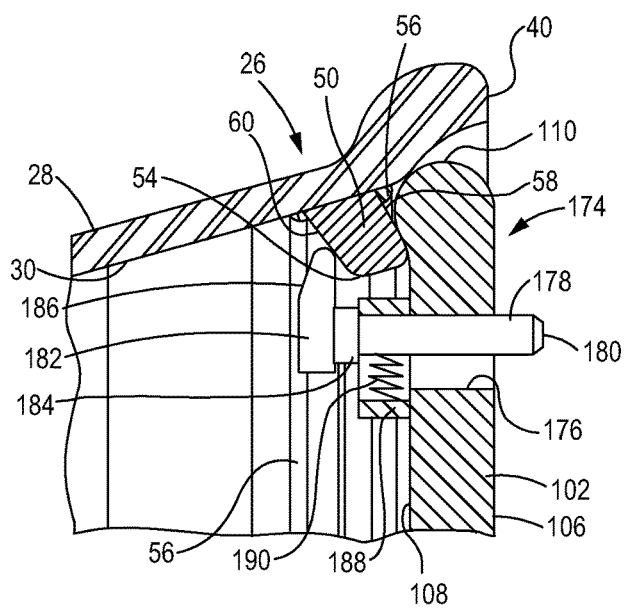
FIG. 12C is the enlarged view of FIG. 12B with the latching pin assembly in a latching pin locked position.

FIGS. 12A-12C illustrate a further alternative embodiment of a wheel cover assembly 170 including the cover body 102 and a cover mounting mechanism 172 with rib engaging elements in the form of a plurality of latching pin assemblies 174. The cover body 102 has a plurality of latching pin slots 176 spaced circumferentially about the cover body outer surface 106 proximate the cover body outer edge 110. Each of the latching pin slots 176 extend through the cover body 102 from the cover body outer surface 106 to the cover body inner surface 108 as shown in FIGS. 12B and 12C, and is elongated in the radial direction. Each latching pin assembly 174 is installed at a corresponding one of the latching pin slots 176. The latching pin assembly 174 includes a rib engaging element in the form of a latching pin 178 extending through the latching pin slot 176 with a latching pin tab end 180 extending from the cover body outer surface 106. A latching pin finger 182 is coupled to the latching pin 178 at a latching pin finger end 184 opposite the latching pin tab end 180, and may include a finger camming surface 186 on an inward side opposite the latching pin finger end 184. The radially outer ends of the latching pin fingers 182 may define the cover mounting mechanism outer diameter ODm.

The latching pin assemblies 174 in the illustrated embodiment further include latching pin mounting brackets 188 mounted to the cover body inner surface 108 proximate the corresponding latching pin slots 176. Each latching pin mounting bracket 188 receives the corresponding latching pin 178 and constrains the latching pin 178 to move between a latching pin unlocked or rib disengaging position (FIG. 12B) and a latching pin locked or rib engaging position (FIG. 12C). A latching pin spring 190 disposed within the latching pin mounting bracket 188 engages the latching pin 178 and imparts a biasing force biasing the latching pin 178 radially outward toward the latching pin locked position. The latching pin slots 176 and/or the latching pin mounting brackets 188 may also orient the latching pins 178 so the latching pin fingers 182 extend radially outward as shown in FIGS. 12B and 12C.

In the latching pin unlocked position, the latching pin 178 is displaced radially inward against the biasing force of the latching pin spring 190. The radial movement can be caused by engagement of the finger camming surface 186 with the rib outward face 58, or by a force as indicated by an arrow 192 in FIG. 12B applied to the latching pin tab end 180 of the latching pin 178. When fully retracted, the latching pin finger 182 does not engage the wheel rib 50 when the cover body inner surface 108 is facing and engaging the rib outward face 58. With the latching pins 178 in their latching pin unlocked positions, the cover mounting mechanism outer diameter ODm defined by the latching pin fingers 182 is less than the rib inner diameter IDrib so that the latching pin fingers 182 can be inserted past the wheel rib 50. Once the cover body 102 is in place as shown in FIGS. 12B and 12C, the force 192, if applied, can be removed and the latching pin fingers 182, which are disposed inward of the rib inward face 60, can move radially outward due to the biasing force of the latching pin spring 190 to the latching pin locked position of FIG. 12C. In the latching pin locked position, the latching pin fingers 182 engage the rib inward face 60 to retain the wheel rib 50 between the latching pin fingers 182 and the cover body inner surface 108.

Fifth Wheel Cover Assembly Embodiment

Figure 13:
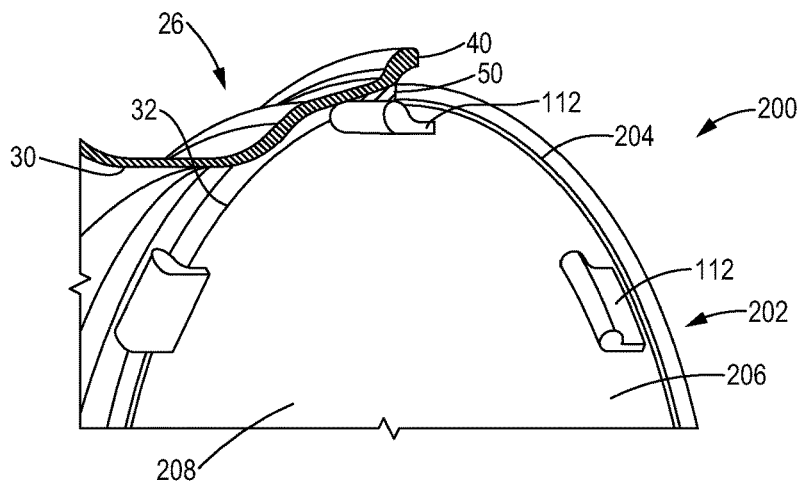
FIG. 13 is an enlarged isometric view of a portion of the wheel rim of FIG. 1 and a fifth embodiment of a wheel cover assembly in accordance with the present disclosure that is mountable on the wheel rim of FIG. 1.

FIG. 13 illustrates an alternative embodiment of a wheel cover assembly 200 that is generally similar in configuration and function to the wheel cover assemblies 100, 140 discussed above. However, the wheel cover assembly 200 has a cover body 202 having a multi-piece construction. The cover body 202 includes an annular cover support ring 204 defining an outer perimeter and the cover body outer diameter ODc, and a flexible body member 206 stretched over and secured to the cover support ring 204. The flexible body member 206 may be formed stretchable, pliable or resilient material, such as cloth materials, fabric materials, canvas materials, polymer-based materials, rubbers or the like. The flexible body member 206 is attached to the cover support ring 204 with sufficient tension that the flexible body member 206 does not flap and create unwanted noise when the vehicle travels at highway speeds. The locking arms 112 may be attached to a cover body inner surface 208 at the cover support ring 204, the flexible body member 206, or both, and extend outward from the cover body inner surface 208. The wheel cover assembly 200 may be installed and removed in a similar manner as the wheel cover assemblies 100, 140 as discussed above.

Sixth Wheel Cover Assembly Embodiment

Figure 14A:
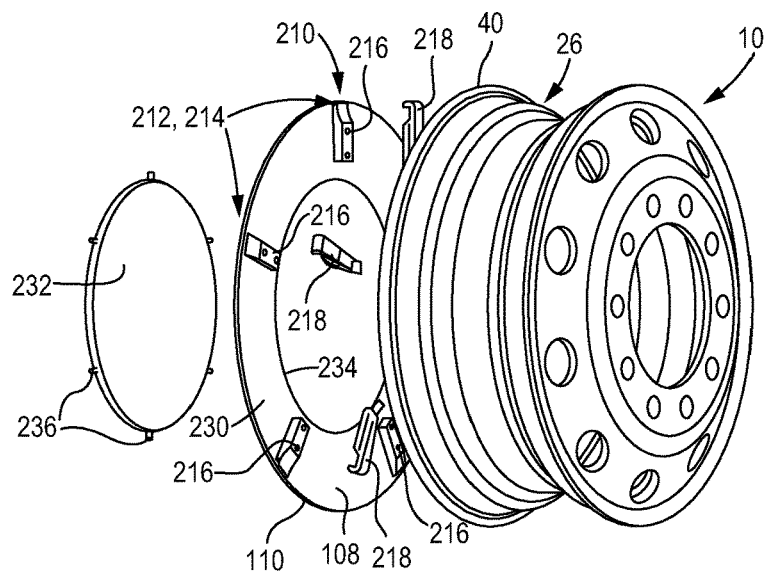
FIG. 14A is a partially exploded view of the wheel rim of FIG. 1 and a sixth embodiment of a wheel cover assembly in accordance with the present disclosure that is mountable on the wheel rim of FIG. 1
Figure 14B:
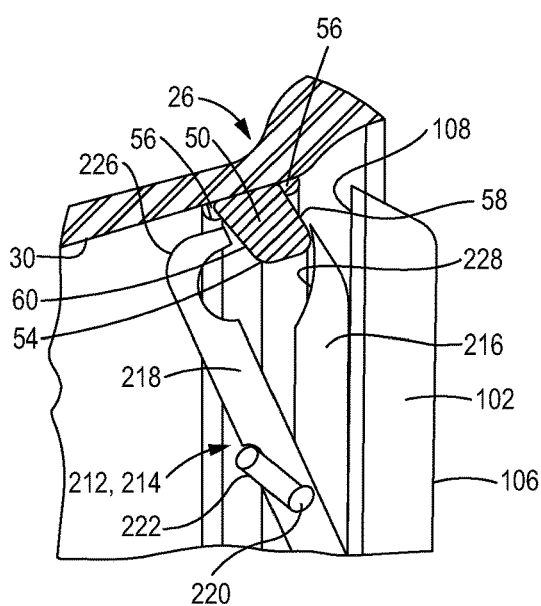
FIG. 14B is an enlarged view of a portion of the wheel rim of FIG. 1 and a corresponding portion of the wheel cover assembly of FIG. 14A mounted to the wheel rim.

FIGS. 14A and 14B illustrate an alternative embodiment of a wheel cover assembly 210 in which a cover mounting mechanism 212 has rib engaging elements in the form of a plurality of locking latches 214 disposed within the wheel rim 26 and the cover body 102 when the wheel cover assembly 210 is installed on the vehicle wheel 10. This arrangement contrasts with the wheel cover assemblies 150, 170 where the latch arms 160 and the latching pins 178, respectively, are accessible from the exteriors of the wheel cover assemblies 150, 170.

The locking latches 214 are circumferentially spaced about the cover body 102 proximate the cover body outer edge 110, and include a latch base 216 mounted to the cover body inner surface 108. A latch arm 218 is pivotally mounted on the latch base 216 by a latch pivot pin 220 that defines a latch axis about which the latch arm 218 rotates. A latch spring 222 is coupled between the latch base 216 and the latch arm 218, and provides a biasing force rotating the latch arm 218 toward a latch locked or rib engaging position (FIG. 14B). The latch arm 218 includes a latch arm tab 224 at a radially inward end and a latch arm finger 226 at a radially outward end. The latch arm tab 224 may be shaped to be engaged by an installer's finger to apply force to rotate the latch arm 218 toward a latch unlocked or rib disengaging position against the force of the latch spring 222. The latch arm finger 226 is configured to engage the rib inward face 60 of the wheel rib 50 and capture the wheel rib 50 between the latch arm finger 226 and a rib engaging surface 228 of the latch base 216 when the locking latch 214 is in the latch closed position.

In the latch unlocked position, the latch arm finger 226 does not engage the wheel rib 50 when the cover body inner surface 108 is facing the wheel rib 50 and the rib engaging surface 228 is engaging the rib outward face 58. If all the locking latches 214 are opened to their latch unlocked positions, the cover mounting mechanism outer diameter ODm defined by the latch arm fingers 226 is less than the rib inner diameter IDrib so that the latch arm fingers 226 can be inserted past the wheel rib 50. Once the cover body 102 is in place as shown in FIG. 14B, the latch arm tabs 224 are released so that the latch arms 218 can rotate under the biasing force of the latch springs 222 to the latch locked position of FIG. 14B where the latch arm fingers 226 engage the rib inward face 60 of the wheel rib 50 to capture the wheel rib 50 between the latch arm fingers 226 and the rib engaging surfaces 228.

Because the locking latches 214 are disposed within the wheel rim 26 when the wheel cover assembly 210 is installed, access to the interior of the wheel rim 26 may be provided by modifying the cover body 102 to have a two-piece construction including an annular cover outer ring 230 and a removable cover inner cap 232. The cover outer ring 230 may include a cover opening 234 that is shaped to match the shape of the cover inner cap 232. During installation, the cover body 102 may be positioned within the open end flange 40 without the cover inner cap 232 attached at the cover opening 234 to allow an installer to reach through the cover opening 234 and manipulate the locking latches 214 to engage the wheel rib 50. A cap attachment mechanism 236 is provided to allow the cover inner cap 232 to snap in place in the cover opening 234 after the locking latches 214 engage the wheel rib 50 to hold the wheel cover assembly 210 in place on the vehicle wheel 10.

As with the locking latches 154 discussed above, the configuration of the locking latches 214 may be varied to achieve a desired path of motion for the latch arms 218 between the latch unlocked position and the latch locked position. In the illustrated embodiment, the locking latch axis created by the latch pivot pin 220 may be parallel to the plane of the cover body 102 so that the latch arm 218 rotates as shown. In alternative embodiments, the latch bases 216 and the latch arms 218 of the locking latches 214 may be modified so that the latch arms 218 rotate about locking latch axes that are perpendicular to the plane of the cover body 102. In other embodiments, the latch bases 216 and the latch arms 218 may be configured so that the latch arms 218 are slidably connected to the latch bases 216 and move through a linear path between the latch unlocked positions and the latch locked positions. Other connection arrangements where the latch arms 218 move through linear, circular or more complex paths of motion are contemplated.

Seventh Wheel Cover Assembly Embodiment

Figure 15A:
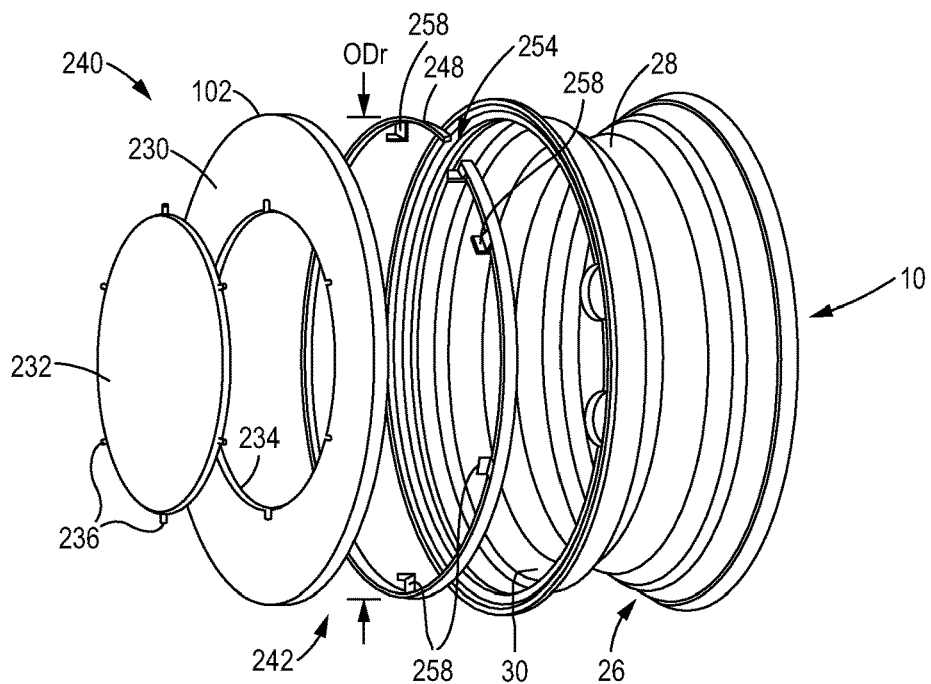
FIG. 15A is an exploded view of the wheel rim of FIG. 1 and a seventh embodiment of a wheel cover assembly in accordance with the present disclosure that is mountable on the wheel rim of FIG. 1
Figure 15B:
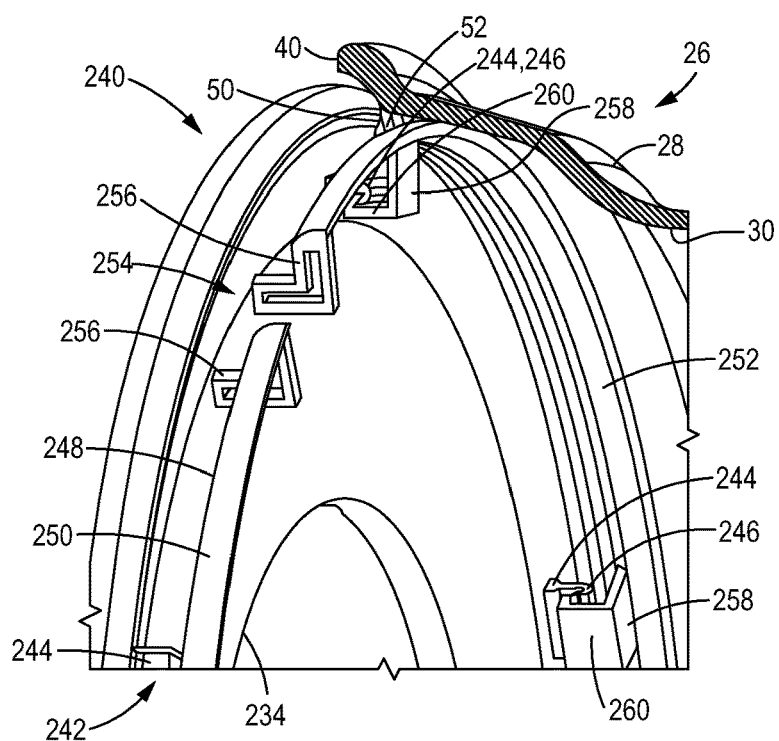
FIG. 15B is an enlarged view of a portion of the wheel rim of FIG. 1 and a corresponding portion of the wheel cover assembly of FIG. 15A mounted to the wheel rim.

FIGS. 15A and 15B illustrate a wheel cover assembly 240 having a cover mounting mechanism 242 with a multi-piece construction for attaching the cover body 102 to the vehicle wheel 10. In this embodiment, the cover body 102 may be similar to the configuration in the wheel cover assembly 210 with the cover outer ring 230 and the cover inner cap 232 to facilitate installation and removal of the wheel cover assembly 240. A plurality of cover clip arms 244 (FIG. 15B) extend from the cover body inner surface 108 and are circumferentially spaced about the cover outer ring 230 proximate the cover body outer edge 110. Each cover clip arm 244 terminates at a cover clip arm hook 246.

The cover mounting mechanism 242 further includes a snap-in retention ring 248 that is separate from the cover body 102 and functions as a rib engaging element. The retention ring 248 has an annular shape with a retention ring outer edge 250 and a retention ring inner edge 252. A portion of the retention ring 248 is cut away to form a compression opening 254. Each end of the retention ring 248 forming the compression opening 254 includes a ring pinch tab 256 extending radially inward from the retention ring inner edge 252. Prior to installation of the wheel cover assembly 240 as shown in FIG. 15A, the retention ring 248 is uncompressed and the retention ring outer edge 250 defines a retention ring outer diameter ODr that is greater than the rib inner diameter IDrib at a rib engaging position. The retention ring 248 may be fabricated from a resilient material so that forces may be applied to the ring pinch tabs 256 to reduce the circumferential length of the compression opening 254 and correspondingly reduce the retention ring outer diameter ODr to less than the rib inner diameter IDrib at a rib disengaging position so that the retention ring 248 may be inserted past the wheel rib 50.

The retention ring 248 may further include a plurality of ring clip arms 258 extending radially inward from the retention ring inner edge 252 and circumferentially spaced about the retention ring inner edge 252. The ring clip arms 258 may correspond in number and position with the cover clip arms 244 on the cover body 102 so that the clip arms 244, 258 can align and engage during installation. To accomplish the engagement, the ring clip arms 258 further include ring clip arm hooks 260 extending longitudinally from the ring clip arms 258 and being configured to engage the cover clip arm hooks 246. As shown in FIG. 15B, the clip arm hooks 246, 260 radially overlap and are arranged so the cover clip arm hooks 246 a radially outward relative to the ring clip arm hooks 260 when engaged. However, the clip arm hooks 246, 260 could be rearranged to reverse their radial positions, or could be reconfigured for any other type of engagement that will secure the cover body 102 to the retention ring 248.

Installation of the wheel cover assembly 240 begins by pressing the ring pinch tabs 256 together to decrease the retention ring outer diameter ODr to less than the rib inner diameter IDrib. The retention ring 248 can then be inserted into the wheel rim 26 until the retention ring 248 is disposed inward of the wheel rib 50. The ring pinch tabs 256 are released to allow the retention ring 248 to expand in the radial direction until the retention ring outer edge 250 engages the rim inner surface 30 at which time the retention ring outer diameter ODr is greater than the rib inner diameter IDrib. The rib inward face 60 engages the retention ring 248 to retain the retention ring 248 within the wheel rim 26.

With the retention ring to await installed, the cover body 102 can be attached to the vehicle wheel 10. In the illustrated embodiment, at least the cover clip arm hooks 246 are rounded to form camming surfaces that will engage the ring clip arm hooks 260. The cover body 102 may be oriented to align the cover clip arm hooks 246 with the corresponding ring clip arm hooks 260 and to bring the clip arm hooks 246, 260 into engagement. Application of additional force on the cover body outer surface 106 causes the cover clip arms 244 and/or the ring clip arms 258 to deflect radially as the cover clip arm hooks 246 are forced past the ring clip arm hooks 260. When the cover clip arm hooks 246 move past the ring clip arm hooks 260, restorative forces in resilient materials from which the clip arms 244, 258 are formed cause the clip arms 244, 258 to deflect radially toward their interlocking positions. When the clip arms 244, 258 are interlocked as shown in FIG. 15B, the cover body 102 will not be separated from the retention ring 248 and the wheel rim 26 under normal operating conditions for the vehicle. If the cover inner cap 232 was not installed with the cover outer ring 230 to provide the installer with access to the cover body inner surface 108 for purposes of ensuring alignment of the clip arms 244, 258, for example, the cover inner cap 232 may be snapped in place in the cover opening 234.

In an alternative installation method, the clip arms 244, 258 may be configured to interlock when the cover clip arms 244 are rotated into alignment with the ring clip arms 258. The retention ring 248 may be installed in the manner described above. The cover body 102 may be oriented with the cover clip arms 244 misaligned with respect to the ring clip arms 258, and inserted through the open end flange 40 until the cover body inner surface 108 is engaged by the rib outward face 58. Once in position, the cover body 102 may be rotated until the clip arms 244, 258 are aligned and the clip arm hooks 246, 260 are interlocking to secure the cover body 102 to the wheel rim 26.

Eighth Wheel Cover Assembly Embodiment

FIGS. 16A and 16B illustrate an alternative embodiment of a cover body 330 having a cover opening 332 that can be implemented the various wheel cover assemblies disclosed herein to provide access to the interior of the wheel rim 26 when the wheel cover assembly is mounted to the vehicle wheel 10. The cover body 330 utilizes a mechanical iris design with a plurality of outer blades 334 and inner blades 336 (FIG. 16B) that can be alternately opened (FIG. 16A) and closed (FIG. 16B) to open and close the cover opening 332. The outer blades 334 are disposed on the side of the cover body outer surface 106 and the inner blades are disposed on the side of the cover body inner surface 108. The cover body 330 includes an annular cover outer ring 338 and an annular cover inner ring 340 rotatably mounted concentrically with the cover outer ring 338. The cover outer ring 338 has a plurality of radial blade guide slots 342 circumferentially spaced about the cover outer ring 338 that receive blade guide pins 344 attached to corresponding ones of the outer blades 334 and the inner blades 336. A blade pivot pin 346 for each of the blades 334, 336 is pivotally mounted to the cover inner ring 340 to allow the corresponding blade 334, 336 to pivot relative to the cover inner ring 340.

In the open position of FIG. 16A, the cover inner ring 340 has been rotated counterclockwise relative to the cover outer ring 338. As the cover inner ring 340 rotated to the open position, the blades 334, 336 rotate about the blade pivot pins 346 and the blade guide pins 344 slide radially outward in the blade guide slots 342 to expose the cover opening 332. To close the blades 334, 336 over the cover opening 332, the cover inner ring 340 is rotated clockwise to the closed position shown in FIG. 16B. The blade pivot pins 346 move with the cover inner ring 340, and the blade guide pins 344 are pulled radially inward within the blade guide slots 342 to rotate the blades 334, 336 over the cover opening 332.

Depending on the implementation, the blades 334, 336 can be opened and closed manually or automatically. In manual implementations, the installer of the wheel cover assembly or the owner or operator of the vehicle rotates the cover inner ring 340 between the open and closed positions as necessary for installation of the wheel cover assembly and access to the interior of the wheel rim 26. In alternative embodiments, the centripetal and/or centrifugal forces created when the vehicle wheel 10 rotates can be used to close the blades 334, 336 when the vehicle is traveling. The cover body 330 can be configured with springs that bias the blades 334, 336 to the open position when the vehicle wheel 10 is stationary or moving with a relative low angular velocity. As the angular velocity of the vehicle wheel 10 increases, centripetal and or centrifugal forces acting on the blades 334, 336 may cause the blades 334, 336 to rotate toward the closed position. If necessary, counterweights can be added that will displace radially outward to force the rotation of the blades 334, 336 to the closed position when the vehicle wheel 10 reaches a desired minimum angular velocity. As the vehicle wheel 10 slows, the biasing force of the springs will overcome the other forces and cause the blades 334, 336 to rotate back to the open position.

Ninth Wheel Cover Assembly Embodiment

FIGS. 17A and 17B illustrate a further alternative embodiment of a wheel cover assembly 270 providing a permanent, rigid attachment of the cover body 102, 230/232 to the wheel rim 26 via the wheel rib 50. The cover body 102, 230/232 may be circular as illustrated previously. Alternatively, the cover body 102, 230/232 may have a plurality of cover body fastening tabs 272 extending radially outward from the cover body outer edge 110 and circumferentially spaced about the cover body outer edge 110. The cover body fastening tabs 272 may define the cover body outer diameter ODc that is less than the open end flange inner diameter IDf and greater than the rib inner diameter IDrib. This configuration allows the cover body 102, 230/232 to be inserted through the open end flange 40 and have the cover body inner surface 108 engaged by the rib outward face 58 at the cover body fastening tabs 272.

Once the cover body 102, 230/232 is in place, any appropriate permanent fastening mechanism can be used to rigidly anchor the cover body 102, 230/232 to the wheel rib 50. In one embodiment, an adhesive may be applied between the cover body fastening tabs 272 and the rib outward face 58. In alternative embodiments, a mechanical connection may be used to secure the cover body 102, 230/232. In the illustrated embodiment, each of the cover body fastening tabs 272 is rigidly secured to the wheel rib 50 by a corresponding rivet 274. The rivets 274 may extend through a fastening tab hole 276 of the cover body 102, 230/232 and an aligning rib hole 278 of the wheel rib 50. During the installation process, the cover inner cap 232 may be removed to allow access for attaching the rivets 274. Those skilled in the art will understand that other permanent or semi-permanent mechanical connection hardware may be used to secure the cover body fastening tabs 272 to the wheel rib 50, and such connection hardware are contemplated by the inventors. Moreover, the cover body fastening tabs 272 may be omitted and the cover body outer diameter ODc of the cover body 102 may be greater than the rib inner diameter IDrib, with fastening tab holes 276 extending through the cover body 102, and the rivets 274 being installed there through.

With the cover body 102, 230/232 secured to the wheel rim 26 and the wheel rib 50, the cover inner cap 232 can be attached at the cover opening 234 to the cover body 102, 230/232. The cover inner cap 232 may extend radially outward and have a cover cap outer diameter such that the cover inner cap 232 covers the rivets 274 and the cover body fastening tabs 272 to optimize the aerodynamics and the aesthetics of the wheel cover assembly. The cap attachment mechanism 236 may provide a removable attachment of the cover inner cap 232 so that the cover inner cap 232 may be removed to permit access to the interior of the wheel rim 26, or for replacement of the cover inner cap 232 if it is damaged. The cover inner cap 232 may be interchangeable with other cover inner caps 232 having different aerodynamic properties, surface treatments, coatings, colors, designs and other variations that a vehicle owner may want to install on the vehicle wheel 10.

Over time, technology develops for monitoring the performance of vehicles, vehicle wheels 10 and wheel rims 26. Such technology may be most effective when mounted to the wheel rim 26 and travel with the wheel rim 26 as the vehicle is operated. Where it is desired to provide the technology, the wheel cover assembly of FIGS. 17A and 17B may facilitate mounting the technology within the wheel rim 26 and providing access to the technology when necessary. The components of the technology may be mounted to the cover body 102 or the cover outer ring 230 as an alternative to mounting the technology directly to the rim inner surface 30. The configuration of the cover body 102 or the cover outer ring 230 can be modified as necessary to provide sufficient mounting surfaces and support for the technology within the wheel rim 26. The cover inner cap 232 may be configured to provide access to the components to allow for maintenance on the components or replacement of the components or a power source of the technology. Configurations of the cover body 102, the cover outer ring 230 and the cover inner cap 232 to facilitate installation and access to the technology components will vary based on the equipment being installed, and such configurations and modifications are contemplated by the inventors.

Tenth Wheel Cover Assembly Embodiment

Figure 18:
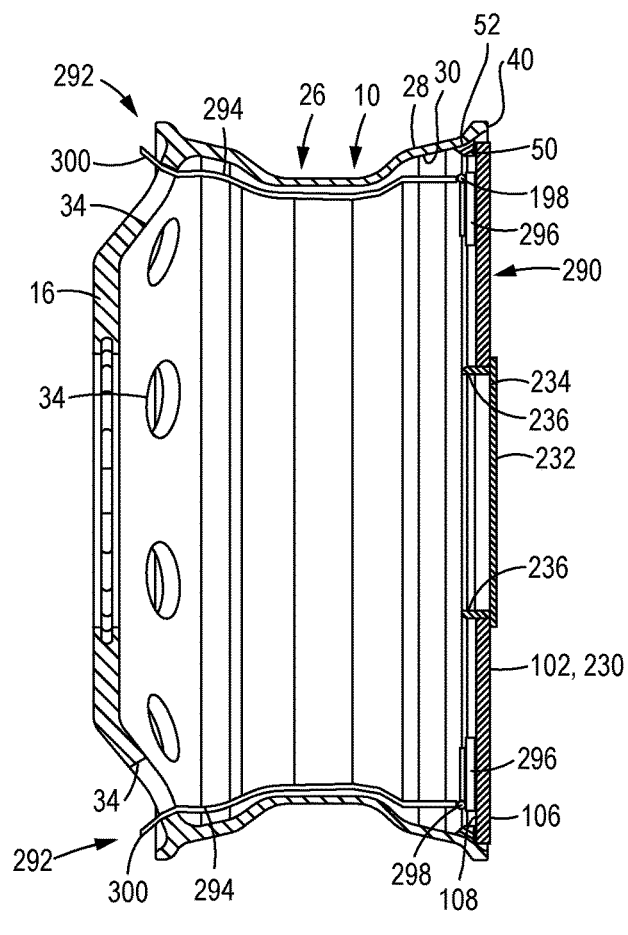
FIG. 18 is the cross-sectional view of the wheel rim of FIG. 4 with a tenth embodiment of a wheel cover assembly in accordance with the present invention mounted to the wheel rim.

FIG. 18 illustrates an example of an alternative embodiment of a wheel cover assembly 290 having a cover mounting mechanism 292 utilizing structures of the vehicle wheel 10 in addition to the wheel rib 50 to secure the wheel cover assembly 290 to the vehicle wheel 10. In this embodiment, the hand holes 34 in the disc face 18 are engaged to retain the wheel cover assembly 290 while the wheel rib 50 supports the cover body 102. The wheel cover assembly 290 may use the cover body 102 is previously described including the cover outer ring 230 and the cover inner cap 232. The cover mounting mechanism 292 may include hand hole engaging arms 294 mounted on the cover body inner surface 108. As shown, the cover mounting mechanism 292 includes two hand hole engaging arms 294 positioned on diametrically opposite sides of the cover body inner surface 108. However, additional hand hole engaging arms 294 may be used and be spaced about the cover body inner surface 108 proximate the cover body outer edge 110 to align with the corresponding hand holes 34.

The hand hole engaging arms 294 may be spring loaded to create an engagement force necessary to retain the wheel cover assembly 290 on the vehicle wheel 10. Each hand hole engaging arm 294 may have an engaging arm base 296 mounted on the cover body inner surface 108. The hand hole engaging arm 294 may be pivotally connected to the engaging arm base 296 for relative rotational movement. An engaging arm spring 298 is operatively connected between the hand hole engaging arm 294 and the engaging arm base 296. In the illustrated embodiment, the engaging arm spring 298 may bias the hand hole engaging arms 294 to rotate toward a radially outward disengaged position (not shown) that may extend beyond the cover body outer edge 110. In alternative embodiments, the engaging arm spring 298 may bias the hand hole engaging arm 294 to rotate in the opposite direction toward a radially inward disengaged position.

To install the wheel cover assembly 290, an installer may rotate the hand hole engaging arms 294 from the disengaged positions toward the engaged position shown in FIG. 18 where the hand hole engaging arms 294 extend outward from the cover body inner surface 108. With the hand hole engaging arms 294 rotated, engaging arm ends 300 may be inserted past the wheel rib 50 and into the corresponding hand holes 34. The installer may gain access to the hand hole engaging arms 294 through the cover opening if needed to align the engaging arm ends 300 with the hand holes 34. The engaging arm ends 300 may have curved shapes allowing the engaging arm ends 300 to hook the edges of the hand holes 34. With the engaging arm ends 300 inserted, the cover body 102 is inserted through the open end flange 40 until the cover body inner surface 108 is engaged by the rib outward face 58. The cover inner cap 232 can also be snapped on to the cover outer ring 230 if necessary to complete the installation of the wheel cover assembly 290.

Eleventh Wheel Cover Assembly Embodiment

Figure 19:
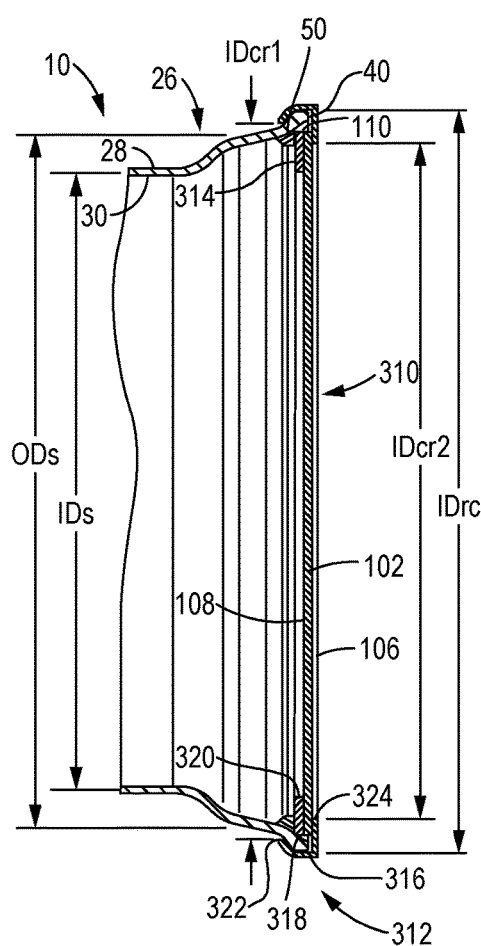
FIG. 19 is the cross-sectional view of the wheel rim of FIG. 4 with a eleventh embodiment of a wheel cover assembly in accordance with the present invention mounted to the wheel rim.

FIG. 19 illustrates a further alternative embodiment of a wheel cover assembly 310 having a cover mounting mechanism 312 with a multi-piece construction and utilizing structures of the vehicle wheel 10 in addition to the wheel rib 50 to attach the cover body 102 to the vehicle wheel 10. In the illustrated embodiment, the wheel cover assembly 310 is mounted to the vehicle wheel 10 via engagement of the wheel rib 50 and the open end flange 40. The cover mounting mechanism 312 includes an inner support ring 314 and an outer retainer ring 316. The inner support ring 314 is annular and has a support ring outer edge 318 defining a support ring outer diameter ODs that is less than the open end flange inner diameter IDf and greater than the rib inner diameter IDrib. A support ring inner edge 320 defines a support ring inner diameter IDs that is less than the rib inner diameter IDrib so that the support ring inner edge 320 extends radially inward relative to the rib inner edge 54 when the wheel cover assembly 310 is installed as shown in FIG. 19.

The outer retainer ring 316 is configured to snap onto the open end flange 40 and partially overlap the cover body 102. The outer retainer ring 316 is also annular and forms a channel when viewed in cross-section to facilitate attachment over the open end flange 40. The channel of the outer retainer ring 316 may have a ring channel inner diameter IDrc that is greater than the open end flange outer diameter ODf. A first retainer ring inner edge 322 may have a first retainer ring inner diameter IDrr1 that is less than the open end flange outer diameter ODf, and a second retainer ring inner edge 324 may have a second retainer ring inner diameter IDrr2 that is less than the open end flange inner diameter IDf and the cover body outer diameter ODc.

The wheel cover assembly 310 is installed on the vehicle wheel 10 by first inserting the inner support ring 314 into the open end 14 until the inner support ring 314 faces and engages the rib outward face 58. The cover body 102 is then inserted with the cover body inner surface 108 facing and engaging the inner support ring 314. The overlapping area between the inner support ring 314 and the cover body 102 provides additional support to the cover body 102 against forces pressing the cover body 102 inward into the wheel rim 26. The installation may be completed by snapping the first retainer ring inner edge 322 of the outer retainer ring 316 over the open end flange 40 so that the open end flange 40 is disposed within the channel of the outer retainer ring 316. The outer retainer ring 316 may be fabricated from a resilient material allowing the first retainer ring inner edge 322 to expand as it passes over the open end flange 40, and to return to its normal shape once past the open end flange 40. With the outer retainer ring 316 installed as shown, the second retainer ring inner edge 324 extends radially inward of the cover body outer edge 110 to retain the cover body 102 within the open end flange 40.

INDUSTRIAL APPLICABILITY

The wheel cover assemblies in accordance with the present disclosure provide a solution for covering the exposed cavity of the wheel rim 26. With the wheel cover assemblies installed, greater aerodynamic continuity across the outer wall of the tire mounted on the vehicle wheel 10 and the cover body outer surface 106. Turbulence in the airstream flow past the vehicle wheel 10 is reduced. Correspondingly, noise and drag created at highway speeds are reduced; the latter leading to improved fuel efficiency for the vehicle. Covering the cavity of the wheel rim 26 can also improve the appearance of the vehicle.

The various embodiments of the wheel cover assemblies provide cover mounting mechanisms that facilitate installation and removal of the wheel cover assemblies. Consequently, the wheel cover assemblies are readily removable for inspection and maintenance of the vehicle wheel 10, changing the tire, and cleaning the wheel cover assembly. The cover mounting mechanisms take advantage of the wheel rib 50 being installed on the rim inner surface 30, extending inward from the rim inner surface 30 proximate the open end flange 40 and providing a mounting structure to which the cover body 102 can be mounted.

Wheel covers for existing wheel rims often attach to the central hub of the vehicle wheel. Varying hub designs, wheel offsets and wheel maintenance require unique equipment, adjustment and assembly to mount the wheel covers to the central hubs. By utilizing the installable wheel rib 50 as the attachment point for the wheel cover assemblies in accordance with the present disclosure, many of the design and installation variables may be removed. Vehicles wheels and wheel cover assemblies can be supplied to original equipment manufacturers without the need for adjustment or complex assembly. New and replacement parts may not need to be customized for varying wheel offsets. Simple attachment utilizing the installable wheel rib 50 is facilitated.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A wheel cover assembly for a vehicle wheel having a wheel rim with a rim inner surface, an open end flange having an open end flange inner diameter, the wheel cover assembly comprising:
    a wheel rib having an annular shape, a rib inner diameter, and a rib outer diameter that is less than the open end flange inner diameter so that the wheel rib is attachable to the rim inner surface of the wheel rim to extend inward from the rim inner surface of the wheel rim proximate the open end flange;
    a cover body having a cover body outer surface, a cover body inner surface opposite the cover body outer surface, and a cover body outer edge having a cover body outer diameter that is greater than the rib inner diameter and less than the open end flange inner diameter; and
    a cover mounting mechanism operatively connected to the cover body and having a cover locking position,
    wherein the cover mounting mechanism engages the wheel rib when the cover body inner surface is facing the wheel rib and engaging one of the wheel rib and the rim inner surface to retain the wheel rib between the cover mounting mechanism and the cover body and secure the wheel cover assembly to the vehicle wheel when the wheel rib is attached to the rim inner surface,
    wherein the cover mounting mechanism includes
        a plurality of locking arms extending from the cover body inner surface and circumferentially spaced about the cover body inner surface proximate the cover body outer edge,
        wherein each of the plurality of locking arms includes
            a locking arm body extending from the cover body inner surface and having a body proximal end connected to the cover body inner surface, a body distal end opposite the body proximal end, an outer surface extending from the body proximal end to the body distal end, a radial inner surface opposite the outer surface and extending from the body proximal end to the body distal end, and a groove in the radial inner surface, and
            a locking arm detent extending radially outward from the outer surface of the locking arm body proximate the body distal end, and
            wherein the locking arm detent defines a cover mounting mechanism outer diameter that is greater than the rib inner diameter, and wherein the locking arm bodies deflect radially inward when the locking arm detents are engaged by the wheel rib and deflect radially outward when the locking arm detents are disposed on an opposite side of the wheel rib from the cover body so that the wheel rib is retained between the locking arm detents and the cover body inner surface, and
        a tension ring,
            wherein the tension ring includes a first circumferential end, a second circumferential end, and a circumferential opening between the first circumferential end and the second circumferential end,
            wherein the tension ring is installed within the groove of the locking arm body, such that the tension ring is positioned within the same radially extending plane defined by the rib, and
            wherein the tension ring is configured to deflect radially inward at the circumferential opening when the locking arm bodies deflect radially inward, and wherein the tension ring is configured to deflect radially outward at the circumferential opening when the locking arm detents are disposed on the opposite side of the wheel rib from the cover body.

2. The wheel cover assembly according to claim 1, comprising a weld attaching the wheel rib to the rim inner surface.

3. The wheel cover assembly according to claim 2, therein the weld extends around a circumference of the wheel rib.

4. The wheel cover assembly according to claim 1, comprising a rib seal attached between the rim inner surface and a rib outer edge to attach the wheel rib to the rim inner surface.

5. The wheel cover assembly according to claim 1, comprising an adhesive attaching the wheel rib to the rim inner surface.

6. The wheel cover assembly according to claim 1, comprising a plurality of attachment blocks mounted to the rim inner surface and circumferentially spaced about the rim inner surface, wherein the wheel rib is attached to the plurality of attachment blocks to attach the wheel rib to the rim inner surface.

7. A method for mounting a wheel cover assembly to a vehicle wheel having a wheel rim, the method for mounting the wheel cover assembly comprising:
attaching a wheel rib having an annular shape to a rim inner surface of the wheel rim proximate an open end flange of the wheel rim having an open end flange inner diameter so that the wheel rib extends radially inward from the rim inner surface; positioning a cover body of the wheel cover assembly proximate the wheel rib;
and engaging the wheel rib with a cover mounting mechanism when the cover body is facing the wheel rib so that the wheel cover assembly engages one of the wheel rib and the rim inner surface to retain the wheel rib between the cover mounting mechanism and the cover body to secure the wheel cover assembly to the vehicle wheel,
wherein the cover mounting mechanism includes
a plurality of locking arms extending from the cover body,
wherein each of the plurality of locking arms includes
a locking arm body having an outer surface, a radial inner surface opposite the outer surface, and a groove in the radial inner surface, and
a locking arm detent extending radially outward from the outer surface of the locking arm body, and
wherein the locking arm bodies deflect radially inward when the locking arm detents are engaged by the wheel rib and deflect radially outward when the locking arm detents are disposed on an opposite side of the wheel rib from the cover body so that the wheel rib is retained between the locking arm detents and a cover body inner surface, and
a tension ring,
wherein the tension ring includes a first circumferential end, a second circumferential end, and a circumferential opening between the first circumferential end and the second circumferential end,
wherein the tension ring is installed within the groove of the locking arm body, such that the tension ring is positioned within the same radially extending plane defined by the rib, and wherein the tension ring is configured to deflect radially inward at the circumferential opening when the locking arm bodies deflect radially inward, and wherein the tension ring is configured to deflect radially outward at the circumferential opening when the locking arm detents are disposed on the opposite side of the wheel rib from the cover body.

8. The method for mounting the wheel cover assembly according to claim 7, wherein attaching the wheel rib comprises welding the wheel rib to the rim inner surface.

9. The method for mounting the wheel cover assembly according to claim 8, wherein welding the wheel rib comprises forming a weld around a circumference of the wheel rib.

10. The method for mounting the wheel cover assembly according to claim 7, wherein attaching the wheel rib comprises: attaching a rib seal to the rim inner surface; and attaching the wheel rib to the rib seal.

11. The method for mounting the wheel cover assembly according to claim 7, wherein attaching the wheel rib comprises attaching the wheel rib to the rim inner surface with an adhesive.

12. The method for mounting the wheel cover assembly according to claim 7, wherein attaching the wheel rib comprises: mounting a plurality of attachment blocks to the rim inner surface with the plurality of attachment blocks being circumferentially spaced about, the rim inner surface; and attaching the wheel rib to the plurality of attachment blocks.

13. A wheel cover assembly for a vehicle wheel having a wheel rim, the wheel cover assembly comprising:
a wheel rib having an annular shape, a rib inner diameter, and a rib outer diameter that is less than an open end flange inner diameter of an open end flange of the wheel rim so that the wheel rib is insertable through the open end flange and attachable to a rim inner surface of the wheel rim to extend inward from the rim inner surface of the wheel rim proximate the open end flange;
a cover body having a cover body outer surface, a cover body inner surface opposite the cover body outer surface, and a cover body outer edge having a cover body outer diameter that is greater than the rib inner diameter of the wheel rib; and
a cover mounting mechanism operatively connected to the cover body, wherein the cover mounting mechanism includes
a plurality of rib engaging elements disposed on the cover body inner surface and circumferentially spaced about the cover body inner surface proximate the cover body outer edge, and
a tension ring,
wherein the tension ring includes a first circumferential end, a second circumferential end, and a circumferential opening between the first circumferential end and the second circumferential end,
wherein the tension ring is engaged with the plurality of rib engaging elements,
wherein the plurality of rib engaging elements define a cover mounting mechanism outer diameter that is greater than the rib inner diameter when the plurality of rib engaging elements are disposed in a rib engaging position and is less than the rib inner diameter when the plurality of rib engaging elements are disposed in a rib disengaging position, and wherein the plurality of rib engaging elements are movable between the rib engaging position to engage the wheel rib and attach the wheel cover assembly to the wheel rim and the rib disengaging position to disengage the wheel cover assembly from the wheel rim, and wherein the tension ring is positioned within the same radially extending plane defined by the rib and the ring is configured to deflect radially inward at the circumferential opening when the plurality of rib engaging elements is moved to the rib engaging position, and wherein the tension ring is configured to deflect radially outward at the circumferential opening when the plurality of rib engaging elements is moved to the rib disengaging position.

14. The wheel cover assembly according to claim 13, comprising a weld attaching the wheel rib to the rim inner surface.

15. The wheel cover assembly according to claim 13, comprising a rib seal attached between the rim inner surface and a rib outer edge to attach the wheel rib to the rim inner surface.

16. The wheel cover assembly according to claim 13, comprising an adhesive attaching the wheel rib to the rim inner surface.

17. The wheel cover assembly according to claim 13, comprising a plurality of attachment blocks mounted to the rim inner surface and circumferentially spaced about the rim inner surface, wherein the wheel rib is attached to the plurality of attachment blocks to attach the wheel rib to the rim inner surface.

* * * * *